United States Patent
Ishii

(10) Patent No.: US 10,863,154 B2
(45) Date of Patent: Dec. 8, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Masatoshi Ishii, Koganei (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 7 days.

(21) Appl. No.: 16/275,106

(22) Filed: Feb. 13, 2019

(65) Prior Publication Data
US 2019/0260976 A1    Aug. 22, 2019

(30) Foreign Application Priority Data

Feb. 20, 2018 (JP) .................... 2018-028113
Feb. 20, 2018 (JP) .................... 2018-028177

(51) Int. Cl.
| | | |
|---|---|---|
| *H04N 9/31* | (2006.01) | |
| *G06F 3/14* | (2006.01) | |
| *G06F 3/147* | (2006.01) | |
| *G09G 3/00* | (2006.01) | |

(52) U.S. Cl.
CPC .......... *H04N 9/3185* (2013.01); *G06F 3/147* (2013.01); *G06F 3/1446* (2013.01); *G09G 3/003* (2013.01); *G09G 2340/14* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 2016/0284048 A1* | 9/2016 | Rekimoto | G06T 15/205 |
| 2018/0146198 A1* | 5/2018 | Atluru | H04N 19/597 |
| 2019/0164333 A1* | 5/2019 | Fukushima | G06T 7/73 |

FOREIGN PATENT DOCUMENTS

JP    2007-318754 A    12/2007

* cited by examiner

*Primary Examiner* — Michelle Chin
(74) *Attorney, Agent, or Firm* — Canon U.S.A., Inc. IP Division

(57) ABSTRACT

An image processing apparatus includes a first acquisition unit configured to acquire an imaging angle of view at which an input image is captured, a second acquisition unit configured to acquire display system information indicating, in a display system including a display portion, a display angle, which is a visual angle at which the display portion is viewed from a viewpoint position, and a generation unit configured to, using a correspondence relationship between a projection plane and the display portion in a virtual space based on the imaging angle of view and the display system information, generate a display image to be displayed on the display portion.

17 Claims, 22 Drawing Sheets

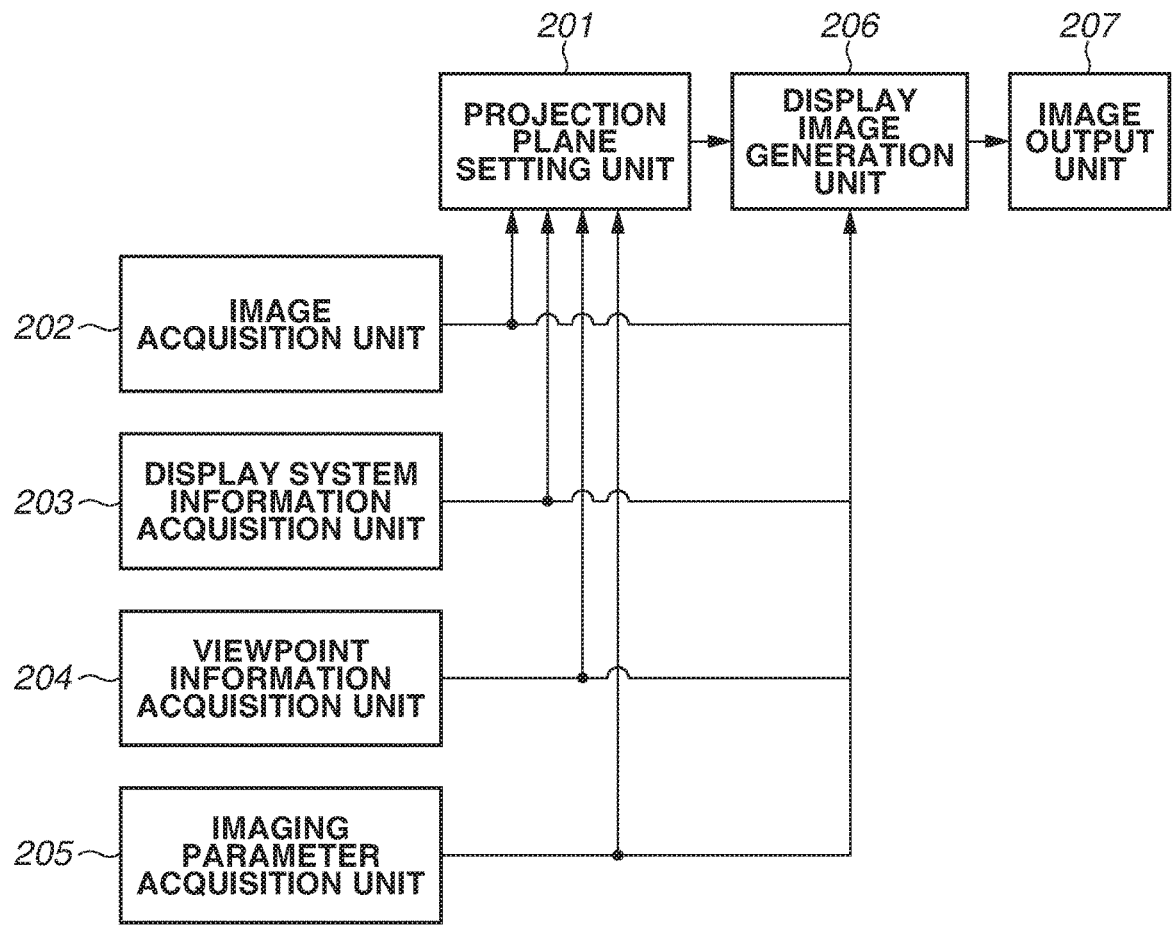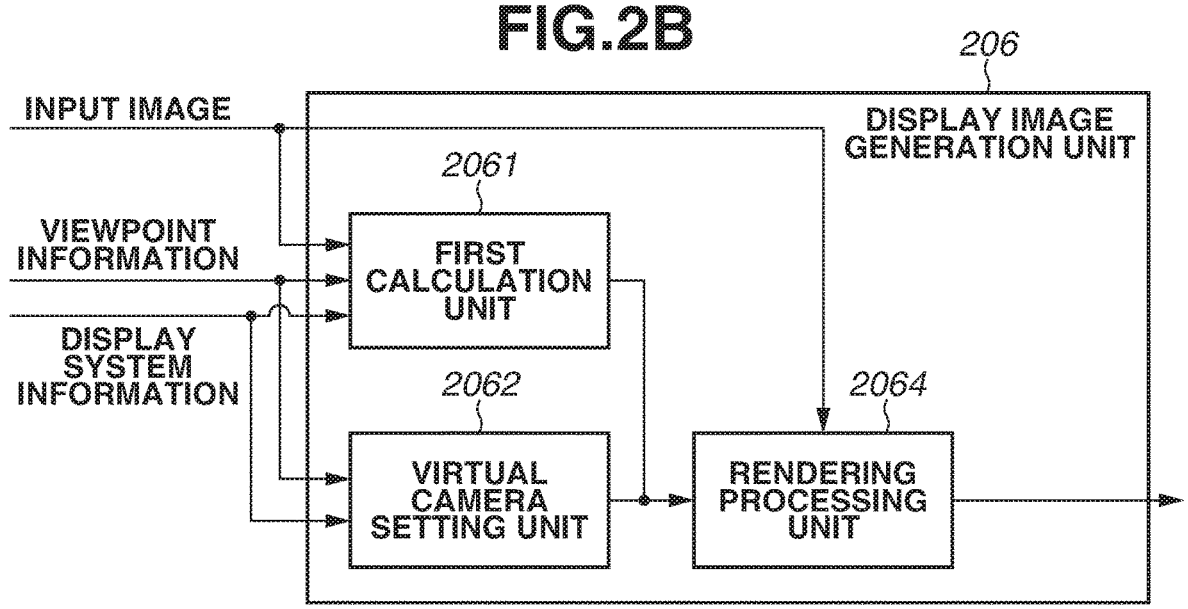

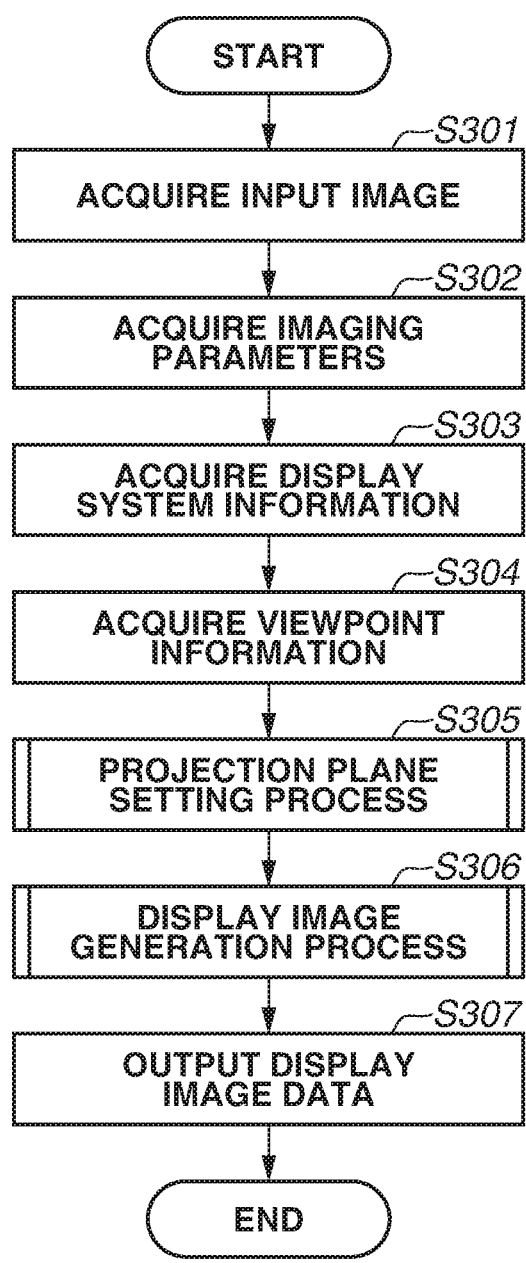

IMAGE PROCESSING APPARATUS, IMAGE PROCESSING METHOD, AND STORAGE MEDIUM

BACKGROUND OF THE INVENTION

Field of the Invention

The aspect of the embodiments relates to a technique for generating an image for a display system that displays a wide-field image.

Description of the Related Art

Conventionally, as a display system that displays an image, the following system has been known. This system displays an image on a display screen placed to cover the field of vision of a viewer, thereby giving the viewer a highly realistic sensation.

Japanese Patent Application Laid-Open No. 2007-318754 discusses a method for displaying an image on a wide viewing angle screen having a spherical shape with its concave surface facing a viewer. According to the method discussed in Japanese Patent Application Laid-Open No. 2007-318754, a mapping process for pasting a flat image to the spherical shape is performed, thereby generating the image to be displayed on the screen.

To generate a wide-field image, the image should be captured at a wide imaging angle of view. However, there may be also a case where the imaging angle of view is insufficient for the angle at which a viewer sees a display portion (hereinafter, referred to as a "display angle"). In such a case, if image processing for widening the angle of view of an image to satisfy the display angle is executed on the image, in the conventional art, in which the viewpoint position of the viewer is not taken into account, unnatural distortion occurs in the displayed image and gives the viewer a feeling of discomfort.

SUMMARY OF THE INVENTION

The aspect of the embodiments is directed to a technique capable of generating a display image with a little feeling of discomfort for a display system that displays an image on a wide-field display portion.

According to an aspect of the embodiments, an image processing apparatus includes a first acquisition unit configured to acquire an imaging angle of view at which an input image is captured, a second acquisition unit configured to acquire display system information indicating, in a display system including a display portion, a display angle, which is a visual angle at which the display portion is viewed from a viewpoint position, and a generation unit configured to, using a correspondence relationship between a projection plane and the display portion in a virtual space based on the imaging angle of view and the display system information, generate a display image to be displayed on the display portion.

Further features of the disclosure will become apparent from the following description of exemplary embodiments with reference to the attached drawings.

BRIEF DESCRIPTION OF THE DRAWINGS

FIGS. 2A and 2B are block diagrams illustrating a functional configuration of the image processing apparatus, and a detailed functional configuration of a display image generation unit, respectively.

FIG. 3 is a flowchart illustrating processing performed by the image processing apparatus.

DESCRIPTION OF THE EMBODIMENTS

Exemplary embodiments of the disclosure will be described below with reference to the drawings. The following exemplary embodiments do not necessarily limit the disclosure, and not all the combinations of the features described in the present exemplary embodiments are essential for a method of the disclosure for solving the issues.

Figure 4:
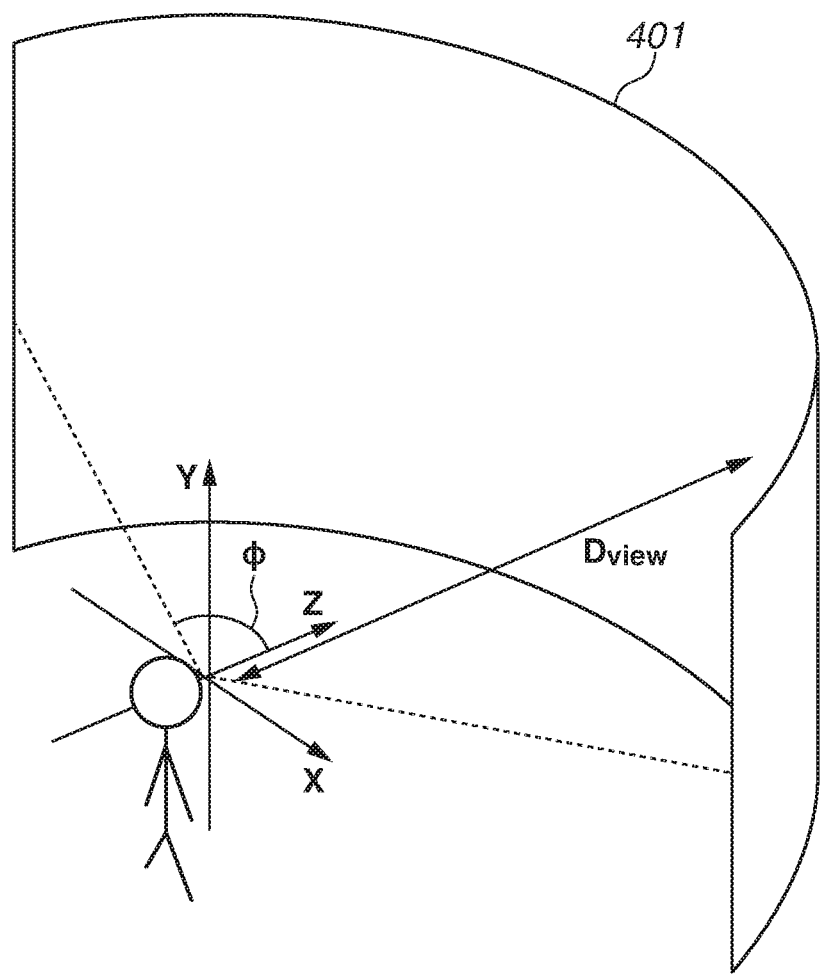
FIG. 4 is a diagram illustrating an example of a configuration of a display system.

A first exemplary embodiment is described taking, as an example, an image processing apparatus for a display system that displays a wide-field image using a curved screen capable of displaying an image to cover the field of vision of a viewer. FIG. 4 illustrates an example of the display system assumed in the present exemplary embodiment. The display system according to the present exemplary embodiment includes a display portion for displaying an image using a curved screen 401. The curved screen 401 has a shape obtained by curving a flat screen in a horizontal direction relative to a viewpoint position. The curved screen 401 can also be said to have a shape obtained by cutting out a part of a cylinder. In the display system, a projector (not illustrated) is placed above a viewer. The projector projects an image onto the curved screen 401, whereby the image can be displayed on the curved screen 401. In the display system, an image is thus displayed on the curved concave surface side of the curved screen 401, whereby the display portion covers the field of vision of the viewer. If an image is displayed by the display system, it is possible to give the viewer a realistic sensation as if the viewer were in the place where the displayed image is captured. In the present exemplary embodiment, a description is given of an image processing apparatus for generating a display image to be displayed by the display system illustrated in FIG. 4. In the present exemplary embodiment, the angle at which the viewer sees an image displayed on the display portion in the display system is referred to as a "display angle". Based on an input image captured using a single imaging apparatus (e.g., a digital camera), the image processing apparatus according to the present exemplary embodiment generates a display image to be displayed on the curved screen 401.

Figure 1:
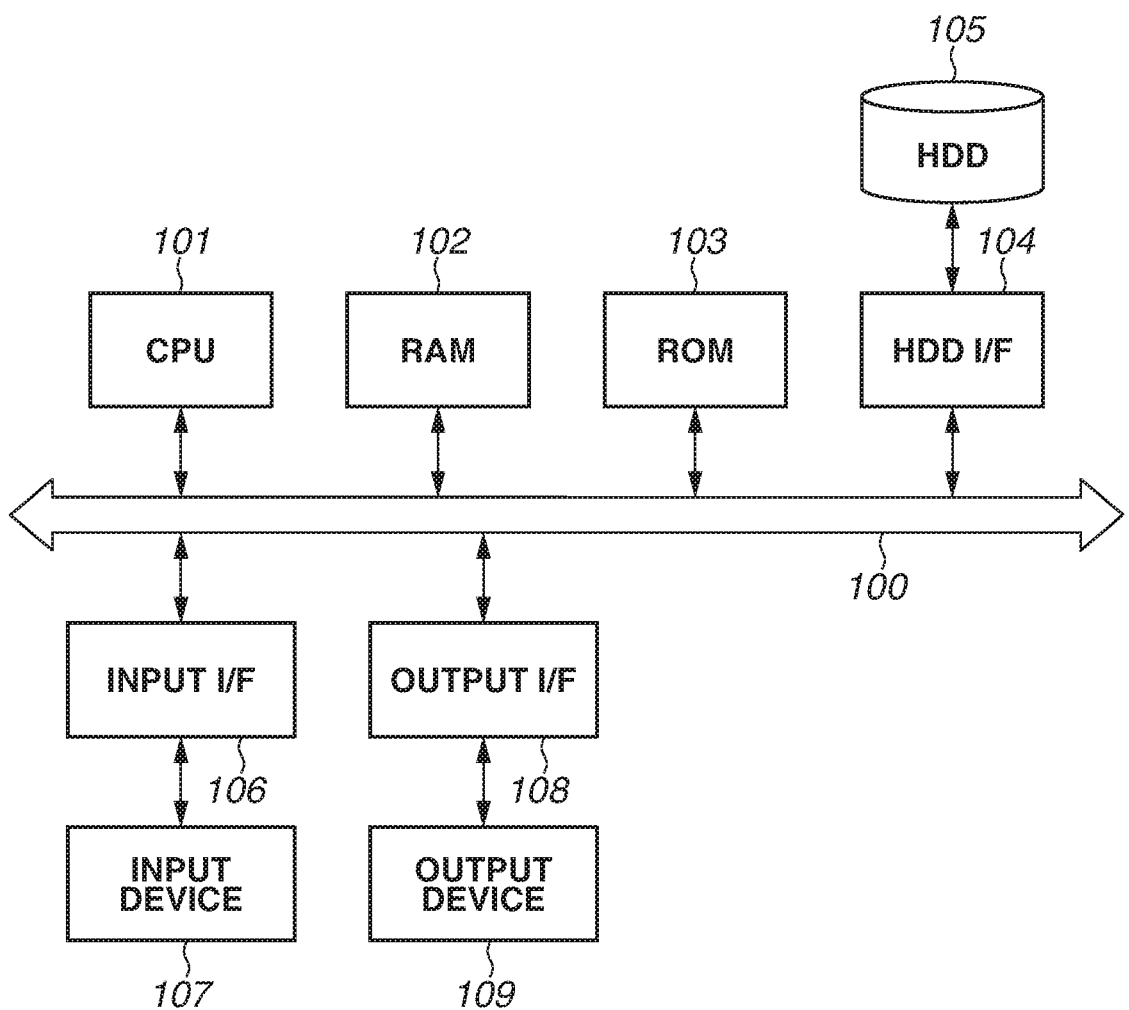
FIG. 1 is a block diagram illustrating a hardware configuration of an image processing apparatus.

FIG. 1 is a block diagram illustrating a hardware configuration of the image processing apparatus according to the present exemplary embodiment. A central processing unit (CPU) 101 executes a program stored in a read-only memory (ROM) 103 or a hard disk drive (HDD) 105, using a random-access memory (RAM) 102 as a work memory and controls components described below via a system bus 100. In this way, various processes described below are executed. An HDD interface (I/F) 104 is an interface such as Serial AT Attachment (ATA) (SATA) and is connected to a secondary storage device such as the HDD 105 or an optical disc drive. The CPU 101 can read and write data from and to the HDD 105 via the HDD I/F 104. Further, the CPU 101 can load data stored in the HDD 105 into the RAM 102 and similarly save the data loaded into the RAM 102 in the HDD 105. Then, the CPU 101 can regard the data loaded into the RAM 102 as a program to execute the program. An input I/F 106 is a serial bus interface such as a Universal Serial Bus (USB) interface or an Institute of Electrical and Electronics Engineers (IEEE) 1394 interface and is connected to an input device 107 such as a keyboard and a mouse. The CPU 101 can read data from the input device 107 via the input I/F 106. An output I/F 108 is a video output interface such as a Digital Visual Interface (DVI) or a High-Definition Multimedia Interface (HDMI®) and is connected to an output device 109 such as a liquid crystal display or a projector. The CPU 101 can send data to the output device 109 via the output I/F 108 and cause the output device 109 to display the data. In the present exemplary embodiment, the output device 109 is the display system including the display portion illustrated in FIG. 4.

FIG. 2A is a block diagram illustrating a functional configuration of the image processing apparatus according to the present exemplary embodiment. In FIG. 2A, the image processing apparatus includes a projection plane setting unit 201, an image acquisition unit 202, a display system information acquisition unit 203, a viewpoint information acquisition unit 204, an imaging parameter acquisition unit 205, a display image generation unit 206, and an image output unit 207. The projection plane setting unit 201 sets a projection plane for generating, from an input image, a display image to be displayed on the display portion in the display system. In the present exemplary embodiment, using a flat virtual projection plane corresponding to the input image (hereinafter, referred to as a "flat projection plane"), the projection plane setting unit 201 generates the display image from the input image. The flat projection plane is set based on the aspect ratio of the input image and the imaging angle of view at which the input image is obtained by imaging. Further, the projection plane setting unit 201 also places the display portion in a virtual space.

The image acquisition unit 202 acquires an image obtained by imaging and outputs the acquired image as the input image to the display image generation unit 206. The display system information acquisition unit 203 acquires information regarding the display portion (the curved screen 401 in this case) in the display system. In the present exemplary embodiment, the display system information acquisition unit 203 acquires information indicating the shape and the size of the screen surface.

The viewpoint information acquisition unit 204 acquires viewpoint information indicating the viewpoint position of the viewer. The viewpoint information is information indicating a three-dimensional position of the viewpoint of the viewer when viewing the image display portion in the display system. In the present exemplary embodiment, before the viewer views the display portion, the display image to be displayed by the display system is generated in advance. However, in the display system illustrated in FIG. 4, if the display angle changes, the display image to be displayed on the display portion also changes. The display angle differs depending on the distance between the display portion and the position from which the viewer views the display portion. In response, in the present exemplary embodiment, to generate the display image in advance, it is to assume the position from which the viewer views the display portion. In the present exemplary embodiment, a viewpoint position from which the viewer views the display portion is acquired as the viewpoint information, thereby identifying the viewpoint position. Further, at this time, the viewing direction of the viewer is set to a horizontal direction from the viewpoint position, regardless of the viewpoint position. The viewpoint information acquisition unit 204 may acquire, as the viewpoint information, information indicating the position of the viewpoint and information indicating the viewing direction from the viewpoint.

The imaging parameter acquisition unit 205 acquires imaging parameters for the imaging apparatus set when the input image is acquired by imaging. Based on metadata attached to the input image, the imaging parameter acquisition unit 205 can acquire the imaging parameters. Alternatively, the imaging parameters may be acquired based on information input by a user through the input device 107.

Based on the positional relationship between the viewpoint position and the display portion, the display image generation unit 206 generates the display image from one input image. At this time, the display image generation unit 206 calculates, as a parameter for rendering the display image, a display angle parameter for adjusting the display angle. The display image generation unit 206 calculates the correspondence relationship between the flat projection plane and the display portion using the display angle parameter and renders the display image. The details of the display image generation unit 206 will be described below. The image output unit 207 outputs the generated display image to the display system.

The flow of processing executed by the image processing apparatus according to the present exemplary embodiment is described below. FIG. 3 is a flowchart illustrating the flow of image processing according to the present exemplary embodiment. The CPU 101 reads a program stored in the ROM 103 or the HDD 104 for achieving the flowchart illustrated in FIG. 3 and executes the program using the RAM 102 as a work area. In this way, the CPU 101 functions as the functional components illustrated in FIG. 2A.

In step S301, the image acquisition unit 202 acquires, as an input image, captured image data, stored in the HDD 105, representing a captured image and stores the captured image data in the RAM 102.

In step S302, the imaging parameter acquisition unit 205 acquires imaging parameters from metadata attached to the captured image data. In the present exemplary embodiment, the imaging parameter acquisition unit 205 acquires, as the imaging parameters, information identifying the imaging angle of view at which the image is captured and the projection method with a lens. In the present exemplary embodiment, the input image is captured through a lens using a central projection method, which is used in a general lens.

In step S303, the display system information acquisition unit 203 acquires display system information regarding the image display portion in the display system. In the present exemplary embodiment, the display system information acquisition unit 203 acquires information indicating the shape and the size of the surface of the display portion on which an image is displayed. In the present exemplary embodiment, as illustrated in FIG. 4, the number of display portions is one. The shape of the display portion is a curved plane of which the arc length in the horizontal direction is $2R_{max}$, and the height is $H_{curve}$. Further, the visual angle (display angle) at which the display portion is viewed from the viewpoint position is $2\varphi$. These pieces of display system information are acquired from the input device 107 and stored in the RAM 102 based on an instruction from the user. Alternatively, these pieces of information may be held as a package of the display system information in advance in the HDD 105 and selected as needed from the HDD 105.

In step S304, based on an instruction from the user, the viewpoint information acquisition unit 204 acquires viewpoint information from the input device 107. In the present exemplary embodiment, the viewpoint information acquisition unit 204 acquires, as the viewpoint information, a distance Dview from the central position on the screen of the curved screen 401.

In step S305, the projection plane setting unit 201 sets a flat projection plane to be used to generate a display image. The details of the projection plane setting process will be described below.

In step S306, the display image generation unit 206 generates display image data representing the display image to be displayed on the display portion (the curved screen 401). The details of the display image generation process will be described below.

In step S307, the image output unit 207 outputs the generated display image corresponding to the display portion from the RAM 102 to the output device 109 via the output I/F 108. Alternatively, the image output unit 207 may store the generated display image in the HDD 105.

Figure 5:
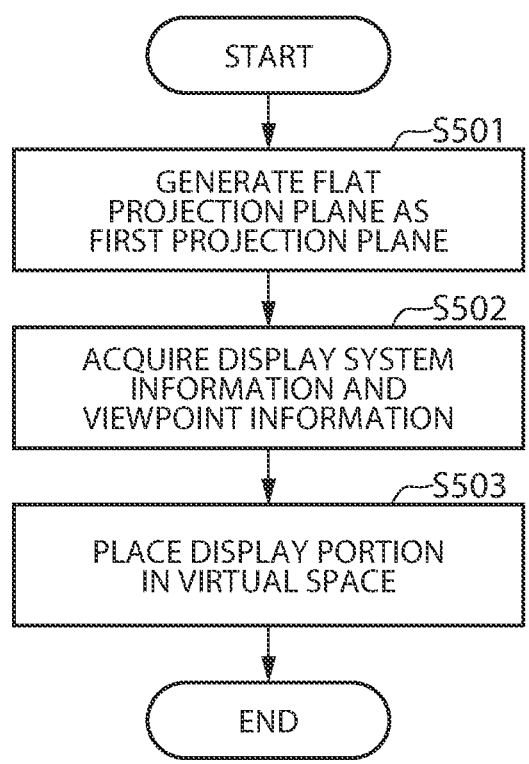
FIG. 5 is a flowchart illustrating a projection plane setting process.

Next, the projection plane setting process is described in detail. In the projection plane setting process, the projection plane to be used in the display image generation process is set. FIG. 5 is a flowchart illustrating details of the projection plane setting process executed by the projection plane setting unit 201. Steps in the flowchart are described below.

In step S501, the projection plane setting unit 201 generates the flat projection plane. The flat projection plane is composed of a rectangular flat plane having the same aspect ratio as that of the input image. Further, the projection plane setting unit 201 calculates the size and the position of the flat projection plane so that the visual angle at which the flat projection plane is viewed from the viewpoint position matches the imaging angle of view. Then, the projection plane setting unit 201 places the flat projection plane in a virtual space.

Figure 7:
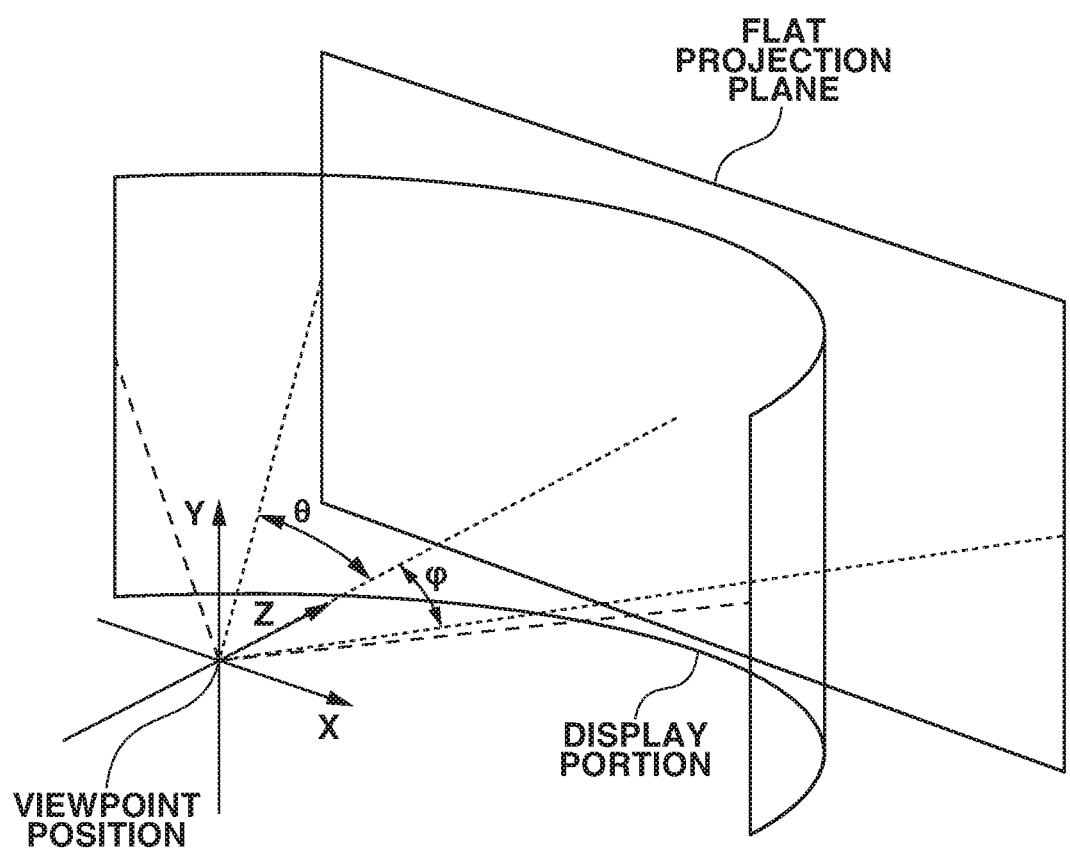
FIG. 7 is a diagram illustrating a relationship between a display portion and a flat projection plane.

FIG. 7 is a diagram illustrating relationships between the viewpoint position, the display portion, and the virtual projection plane. In the virtual space, an XYZ three-dimensional coordinate system with the viewpoint position being the origin is defined. In such a virtual space, the flat projection plane is placed parallel to the XY-plane and at such a position that the Z-axis passes through the center of the flat projection plane. If half the imaging angle of view in the horizontal direction of the input image is assumed to be $\theta$, then as illustrated in FIG. 7, half the visual angle from the viewpoint position to the flat projection plane is $\theta$.

In step S502, the projection plane setting unit 201 acquires the display system information and the viewpoint information. In step S503, based on the display system information and the viewpoint information, the projection plane setting unit 201 places the display portion in the virtual space. More specifically, a screen having the shape of the display portion is placed in such a manner that the distance between the origin (viewpoint position) and the central position of the curved screen 401 is Dview. In other words, the center coordinates of the curved screen 401 are (0, 0, Dview). Further, the curved screen 401 is placed symmetrically with respect to the Z-axis in the virtual space. The cross section of the curved screen 401 according to the present exemplary embodiment viewed from above has a sector shape of which the central angle is the same as the display angle, and the center of the circle coincides with the viewpoint position.

As described above, the projection plane setting unit 201 places the flat projection plane corresponding to the input image and the display portion in the virtual space.

Now, the display image generation process is described in detail. Using a virtual camera placed at the viewpoint position in the virtual space, the display image generation unit 206 renders the display image to be displayed on the display portion, thereby generating the display image.

FIG. 2B is a block diagram illustrating a detailed configuration of the display image generation unit 206. A first calculation unit 2061 calculates a correspondence relationship between the input image and the flat projection plane. A virtual camera setting unit 2062 sets, in the virtual space, a virtual camera corresponding to each of a plurality of displays. Since a single screen is used in the display system assumed in the present exemplary embodiment, a single virtual camera is set. Regarding the virtual camera, using the correspondence relationship between the input image and the flat projection plane, a rendering processing unit 2064 calculates the pixel value of each pixel in an image formed in the virtual camera, thereby generating the display image. Using a parameter for adjusting the display angle (hereinafter, a "display angle parameter") based on the display angle and the imaging angle of view, the rendering processing unit 2064 calculates the correspondence relationship between the X-coordinate of each pixel in the image formed in the virtual camera and X-coordinates on the flat projection plane. The image formed in the virtual camera is, in other words, an image to be projected onto the curved screen 401.

Figure 9:
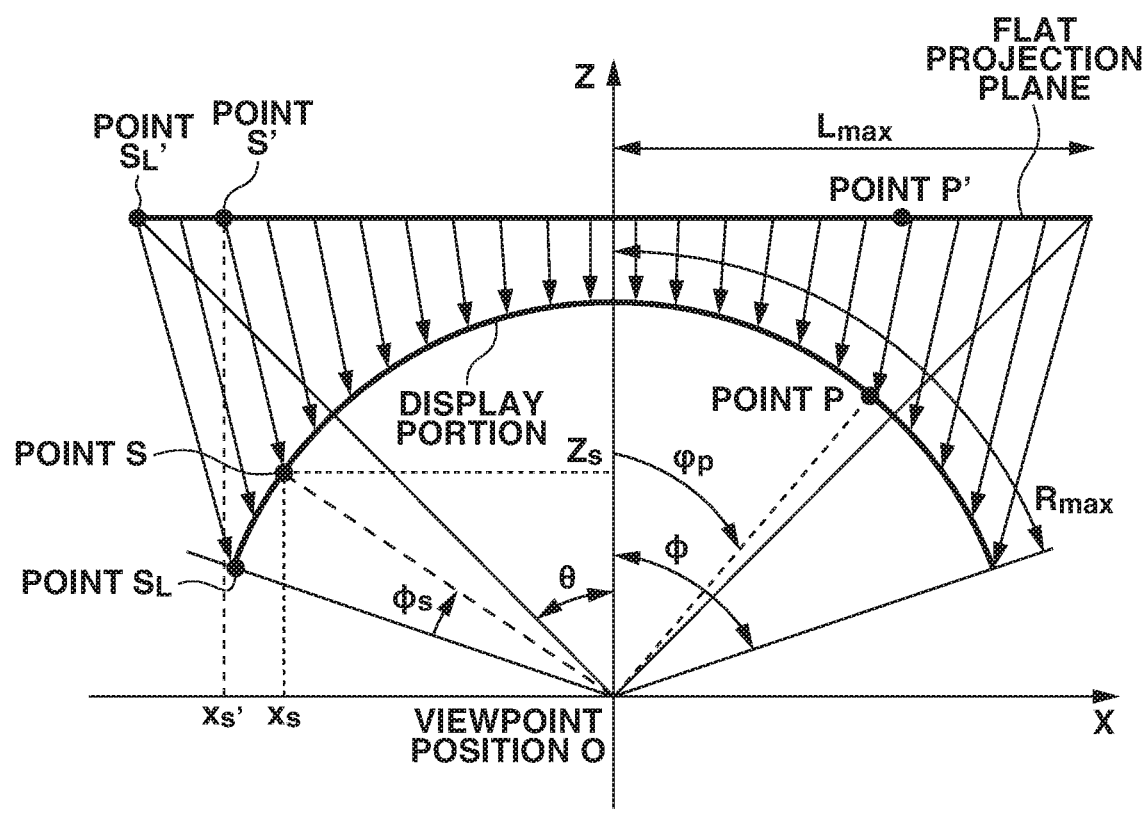
FIG. 9 is a top view illustrating a relationship between the display portion and the flat projection plane.

Here, the display angle parameter is described. FIG. 9 is a top view of the display portion and the flat projection plane. Assume that half the length in the horizontal direction of the flat projection plane is $L_{max}$, and half the arc length of the display portion is $R_{max}$. Each position on the display portion corresponds to a position of the flat projection plane, and the right end of the flat projection plane corresponds to the right end of the display portion. Further, assume that the angle between a line segment connecting a point P on the display portion and an origin O, and the Z-axis is $\varphi_p$. Assume that a point on the flat projection plane corresponding to the point P on the display portion is a point P'. If the length in the horizontal direction of the flat projection plane linearly corresponds to the arc length of the display portion, the ratio of the length from the Z-axis to the point P' on the flat projection plane to the length $L_{max}$ matches the ratio of the arc length from the Z-axis to the point P on the cylindrical projection plane to the arc $R_{max}$, as formula (1).

$$x_{p'}:L_{max}=r\varphi_p:R_{max} \qquad (1)$$

In formula (1), $x_{p'}$ is the X-coordinate of the point V and corresponds to the length from the Z-axis to the point V on the flat projection plane. Further, the radius of the shape of the display portion viewed from above is r. If formula (1) is solved for $x_{p'}$, formula (2) is obtained.

$$x_{p'} = \frac{L_{max}}{R_{max}}r\varphi_p \qquad (2)$$

Half the length $L_{max}$ in the horizontal direction of the flat projection plane is represented as formula (3).

$$L_{max}=L_z \tan\theta \qquad (3)$$

$L_z$, however, indicates a Z-coordinate on the flat projection plane and is a constant value. Further, if half the arc of the cylindrical projection plane is $R_{max}$, the arc $R_{max}$ can be represented as formula (4).

$$R_{max}=r\varphi \qquad (4)$$

Letting $R_{max}/L_{max}$ be k, formula (5) is obtained.

$$k = \frac{L_{max}}{R_{max}}r = \frac{L_z \tan\theta}{\varphi} \qquad (5)$$

In the present exemplary embodiment, k determined as described above based on the display angle and the imaging angle of view is calculated as the display angle parameter. Using formulas (2) and (5), the rendering processing unit 2064 can calculate the X-coordinate of the point V by a formula (6).

$$x_{p'}=k\varphi_p \qquad (6)$$

Figure 6:
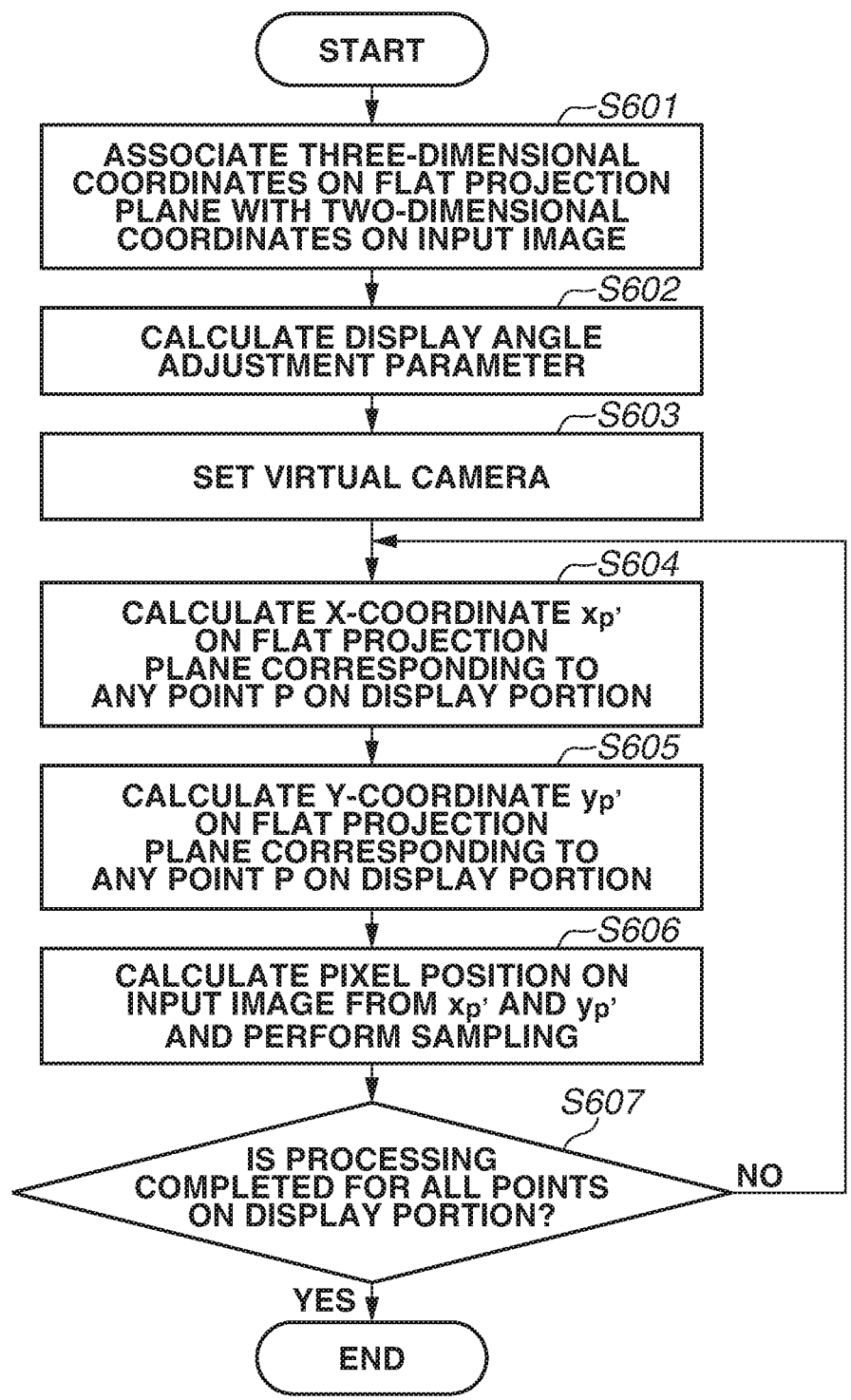
FIG. 6 is a flowchart illustrating a display image generation process.

FIG. 6 is a flowchart illustrating details of the display image generation process according to the present exemplary embodiment.

Figure 8:
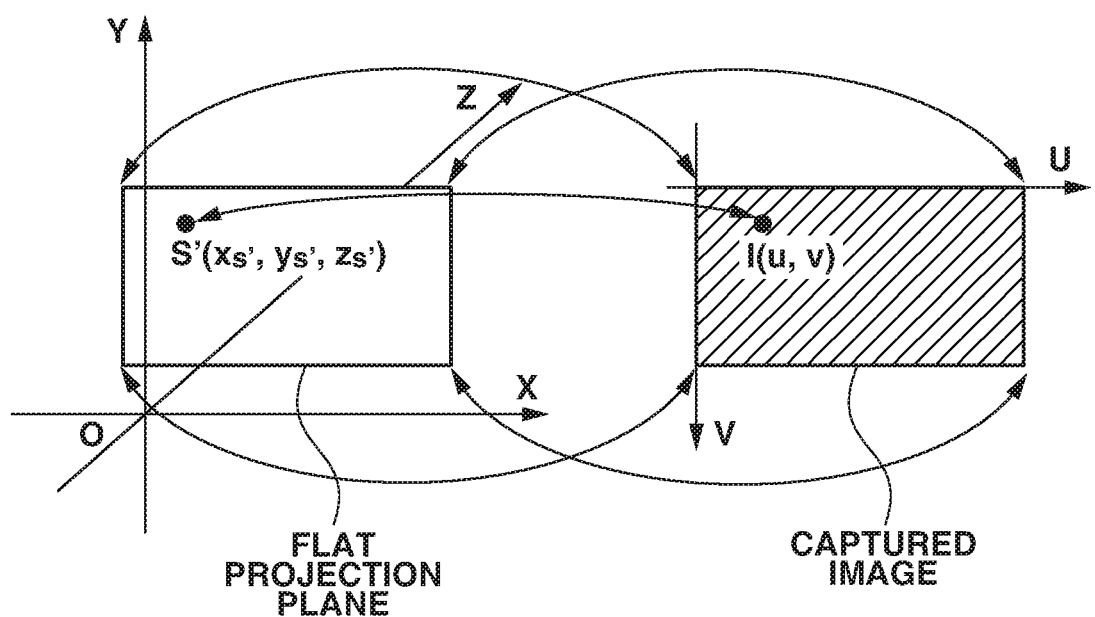
FIG. 8 is a diagram illustrating a correspondence relationship between the flat projection plane and an input image.

In step S601, the first calculation unit 2061 associates the three-dimensional coordinates of the vertices of the flat projection plane in the virtual space with two-dimensional coordinates indicating pixel positions in the input image. This is a process similar to UV mapping in general computer graphics (CG) rendering. In a case where an input image captured through a lens using a central projection is used, as illustrated in FIG. 8, the coordinates of the four corners of the flat projection plane are associated with coordinates indicating the pixel positions at the four corners of the input image. At this time, the pixel position of each pixel in the input image is indicated by using a UV coordinate system where the top-left pixel is the origin (0, 0). The first calculation unit 2061 acquires the UV coordinates of the vertices of the input image and associates the acquired UV coordinates with the three-dimensional coordinates of the vertices of the flat projection plane. The UV coordinates of each pixel other than the four corners are calculated by using linear interpolation. In a case where the projection method of the lens is an equidistant projection or an equisolid angle projection as in a fisheye lens, re-projection may be performed by using a central projection, and then, a similar process may be performed.

In step S602, the rendering processing unit 2064 calculates the display angle parameter in advance. Based on the positions where the projection plane setting unit 201 places the flat projection plane and the display portion in the virtual space, the display angle indicated by the display system information, and the imaging angle of view indicated by the imaging parameters, the rendering processing unit 2064 calculates the display angle parameter by using formula (5).

In step S603, the virtual camera setting unit 2062 places, in the virtual space, a virtual camera to be used for a rendering process for rendering the display image. The virtual camera setting unit 2062 sets the position of the virtual camera and the angle of view. In the present exemplary embodiment, the virtual camera setting unit 2062 sets a single virtual camera for the display portion. First, the virtual camera setting unit 2062 installs the virtual camera at the origin of the virtual space, i.e., the viewpoint position. Further, the direction of the virtual camera is set in such a manner that the optical axis of the virtual camera is directed to the center of the display portion. The angle of view of the virtual camera is a display angle 2φ.

In step S604, to render the pixel value of each pixel in an image obtained by the virtual camera performing imaging, the rendering processing unit 2064 calculates the X-coordinate of the point V on the flat projection plane corresponding to the point P on the display portion, using formula (6).

In step S605, the rendering processing unit 2064 calculates the Y-coordinate of the point V on the flat projection plane corresponding to the point P on the display portion. In the present exemplary embodiment, the aspect ratio of the flat projection plane does not necessarily match the aspect ratio (ratio between the arc length and the height) of the display portion. Thus, when calculating the Y-coordinate of the point V on the flat projection plane, it is necessary to take the difference in aspect ratio into account. At this time, assume that a height obtained by multiplying the width $2L_{max}$ of the flat projection plane by the aspect ratio ($H_{curve}/2R_{max}$) of the display portion is h. In the flat projection plane, the ratio of the above-described height h to the height from $-h/2$ to the point V matches the ratio of the height of the display portion to the height from the lower side to the point P on the display portion, as formula (7).

$$y_{p'} + \frac{h}{2} : h = y_p + \frac{H_{curve}}{2} : H_{curve} \qquad (7)$$

Thus, a Y-coordinate $y_{p'}$ of the point P' is represented by formula (8).

$$y_{p'} = h\left(\frac{y_p}{H_{curve}} + \frac{1}{2}\right) - \frac{h}{2} \qquad (8)$$

Regarding the Z-coordinate, since the flat projection plane is a flat plane, the Z-coordinate does not change at any point on the flat projection plane. Thus, the Z-coordinate may be caused to coincide with the Z-coordinate $L_z$ on the flat projection plane set in the projection plane setting process.

In step S606, using the correspondence relationship between the three-dimensional coordinates of the point P' on the flat projection plane and the two-dimensional coordinates indicating the input image calculated in step S601, the rendering processing unit 2064 converts the three-dimensional coordinates of the point P on the display portion into a position on the input image. The rendering processing unit 2064 performs sampling based on the calculated position on the input image, thereby calculating the pixel value of each pixel in the image obtained by the virtual camera. More specifically, the rendering processing unit 2064 acquires the pixel values of four pixels around the calculated position on the input image. The rendering processing unit 2064 executes interpolation calculations based on the calculated position on the pixel values of the four pixels acquired from the input image, thereby determining the pixel value of each pixel in the image obtained by the virtual camera. When the height of the flat projection plane is $H_{flat}$, and if the value of $y_{p'}$ is smaller than $-H_{flat}/2$ or greater than $H_{flat}/2$, there is no corresponding point on the input image. Thus, a value indicating a black color is set as the pixel value.

In step S607, the rendering processing unit 2064 determines whether processing is completed for all the pixels of the virtual camera. If processing is not completed for all the pixels (NO in step S607), the processing returns to step S604. In step S604, the rendering processing unit 2064 performs sampling on a pixel that has not yet been processed. If processing is completed for all the pixels (YES in step S607), the display image generation process is completed.

Figure 10:
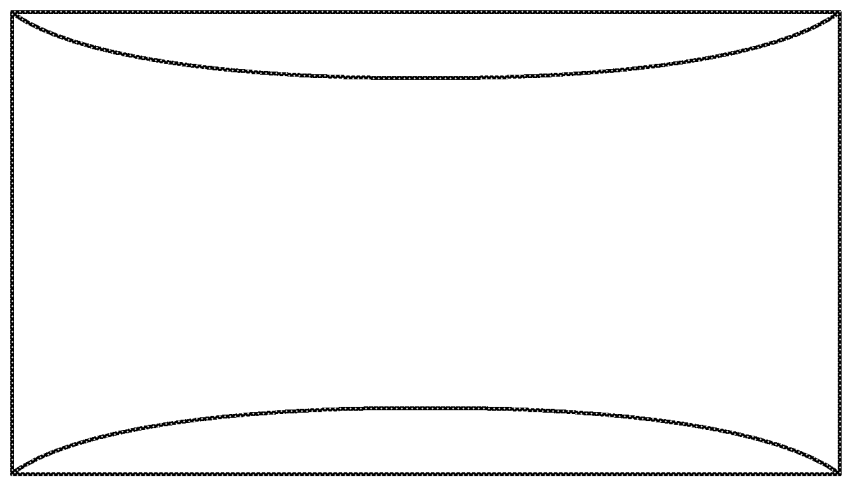
FIG. 10 is a diagram illustrating an area used for the display image generation process in the input image.

FIG. 10 is a diagram illustrating a display image generated in the present exemplary embodiment. Such a display image is projected onto the curved screen 401 by the projector, whereby it is possible to display a wide-field image with a small feeling of discomfort. The input image of which the imaging angle of view is smaller than the display angle, and the display image have a relationship where the display image is obtained by enlarging the input image in the horizontal direction. In the present exemplary embodiment, the input image of which the imaging angle of view is smaller than the display angle is associated with the display portion in such a manner that the input image is even with respect to the angles at which the display portion is viewed from the viewpoint position. Thus, when the display portion is viewed from the viewpoint position, the enlargement ratio of an object is constant. As a result, a display image natural to the viewer is displayed.

In the present exemplary embodiment, as described above, the display image is generated using the display angle parameter k. A calculation method for calculating the correspondence relationships between a flat plane, an upper surface, and a point on the display portion in a case where the display angle parameter k is not used is considered. In FIG. 9, if the X-coordinate of a point S on the display portion is $x_s$ and the Z-coordinate of the point S is $z_s$, an angle $\varphi_s$ at the point S can be represented by formulas (9) to (11). When the point S is a point $S_L$ at the left end of the display portion, the angle $\varphi_s$ is 0 degrees.

$$\varphi_s = \tan^{-1}\left|\frac{z_s}{x_s}\right| - \left(\frac{\pi}{4} - \varphi\right) \text{ if } x_s < 0 \qquad (9)$$

$$\varphi = 2\varphi - \left(\tan^{-1}\left|\frac{z_s}{x_s}\right| - \left(\frac{\pi}{4} - \varphi\right)\right) \text{ else if } x_s > 0 \qquad (10)$$

$$\varphi_s = \varphi \text{ else if } x_s > 0 \qquad (11)$$

If the point S is in the third quadrant of the XZ-plane ($x_s < 0$), the angle $\varphi_s$ can be calculated by subtracting the angle between a line segment connecting the point $S_L$ at the left end of the cylindrical projection plane and the origin, and a line segment connecting the X-axis and the origin, from the angle between a line segment connecting the point S and the origin, and the line segment connecting the X-axis and the origin. Further, if the point S is in the first quadrant of the XZ-plane ($x_s > 0$), the angle $\varphi_s$ can be calculated by subtracting the angle calculated by using formula (1) from the display angle $2\varphi$. If the point S is on the Z-axis ($x_s = 0$), the angle $\varphi_s$ is $\varphi$, which is half the display angle. As described above, each point on the flat projection plane is associated with a corresponding point on the display portion so that the corresponding points are even with respect to angles. At this time, the ratio of the width of the flat projection plane to the length from a point $S_L$ to a point S' on the flat projection plane matches the ratio of the arc length of the cylindrical projection plane to the arc length from the point $S_L$ to the point S on the display portion, as formula (12).

$$\varphi_s : 2\varphi = \left(\frac{W_{flat}}{2} + x_{s'}\right) : W_{flat} \qquad (12)$$

Thus, an X-coordinate $x_{s'}$ of the point S' is represented by the angle $\varphi_s$ as formula (13).

$$x_{s'} = \frac{\varphi_s W_{flat}}{2\varphi} - \frac{W_{flat}}{2} \qquad (13)$$

Formula (9), (10), or (11) is substituted for the angle $\varphi_s$ in formula (13) based on the position of the X-coordinate $x_s$, whereby it is possible to associate the point S on the display portion with the point S' on the flat projection plane. The classifications of the cases, however, performs cumbersome calculations. The method for calculating the X-coordinate on the flat projection plane using formula (6) as in the present exemplary embodiment performs a smaller calculation load than the calculations using formulas (9), (10), (11), and (13).

Figure 11A:
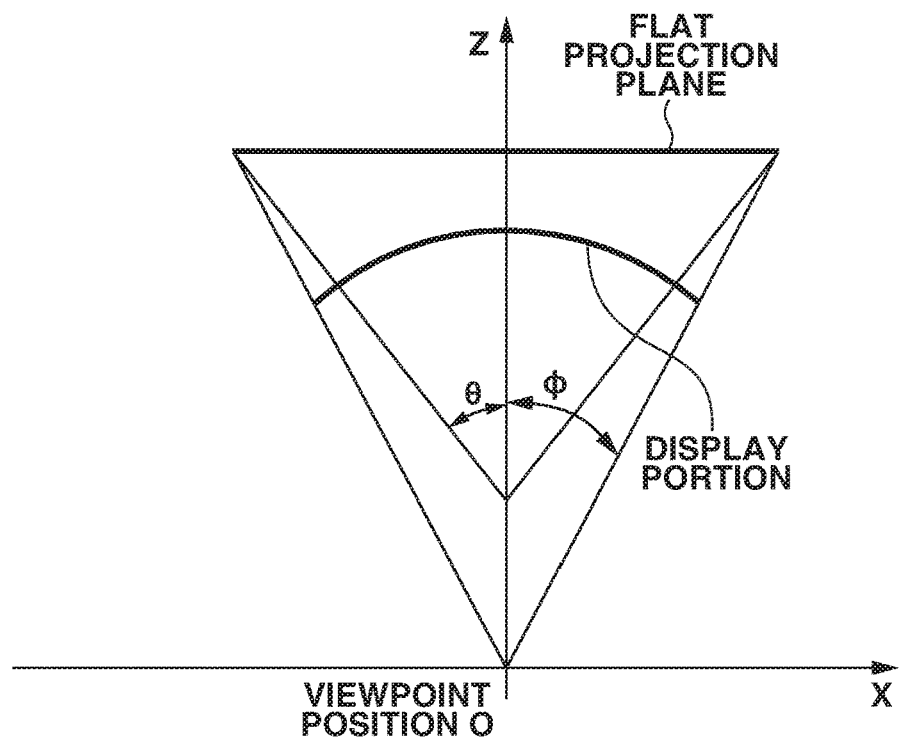
FIGS. 11A and 11B are diagrams illustrating a relationship between a viewpoint position and a display angle.
Figure 11B:
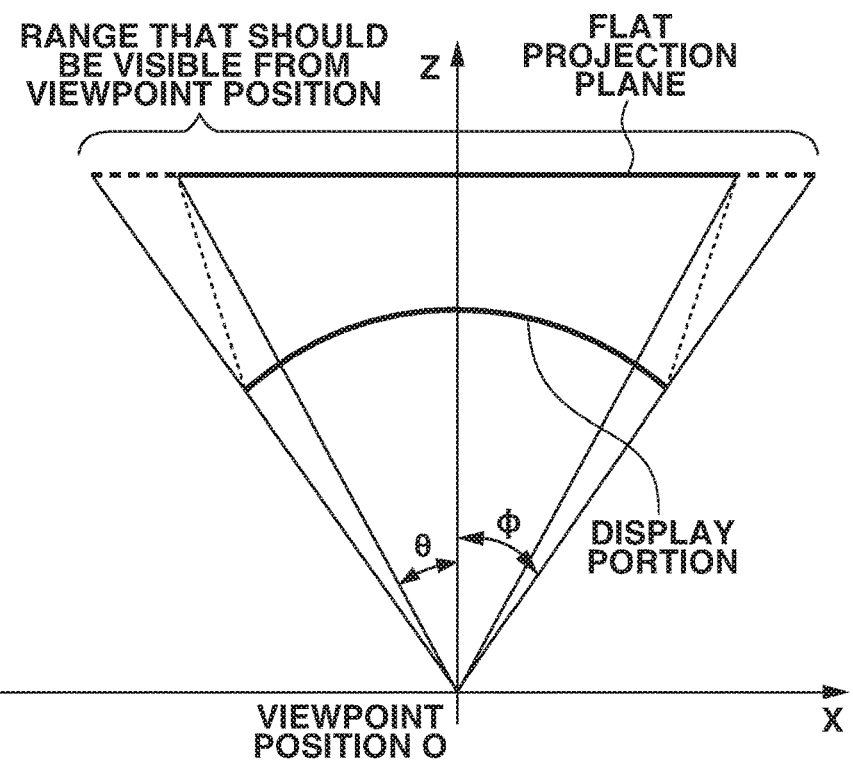

Further, to generate a display image with a realistic sensation in the display system illustrated in FIG. 4, the viewpoint position is appropriately set relative to the display portion. FIGS. 11A and 11B are top views of the display portion and the flat projection plane in the virtual space. FIG. 11A illustrates a case where the imaging angle of view and the display angle almost match each other. In this case, a range visible when viewing the flat projection plane from the viewpoint position is displayed on the display portion. Thus, the viewer can view the display portion with little feeling of discomfort. However, if the viewpoint position is set at a position far from the display portion, the display portion cannot broadly cover the field of vision of the viewer. This impairs a realistic sensation.

On the other hand, FIG. 11B illustrates a case where the display angle is greater than the imaging angle of view. If the viewpoint position is brought closer to the display portion, the display angle increases. In this case, the display portion can broadly cover the field of vision of the viewer. Further, an image visible to the viewer corresponds to a wider range than an image projected onto the flat projection plane. A range including dotted lines obtained by extending the flat projection plane is a range that should be visible from the viewpoint position of the viewer. However, both ends of the flat projection plane are associated with both ends of the display portion, thereby generating a display image satisfying the display angle of the display image. Thus, as described above, if the imaging angle of view is smaller than the display angle, then to generate the display image to be displayed on the display portion, the display image generation unit 206 displays the display image by enlarging the flat projection plane in the horizontal direction. However, in such a case, to the viewer, the image may look different from the original shape or size of an object, or may look different in a sense of distance from each object on the display portion. As described above, the display image to be displayed on the display portion differs depending on the viewpoint position relative to the display portion or the imaging angle of view of the input image. To generate a display image with a realistic sensation, the viewpoint position may be moderately close to the display portion. However, if the display angle from the viewpoint position is excessively larger than the imaging angle of view of the input image, an unnatural display image is generated.

In the present exemplary embodiment, by using the display angle parameter, it is possible to calculate the correspondence relationship between the display portion and the input image in the virtual space with a small calculation load. Consequently, particularly in a case where it is necessary to repeatedly generate the display image while adjusting the viewpoint position or the display angle, it is possible to reduce the load of calculation.

In the first exemplary embodiment, a description has been given of the method for generating the display image to be displayed on the curved screen 401. In a second exemplary embodiment, a description is given of image processing for displaying a wide-field image by a display system, using a plurality of flat display screens. Components similar to those of the first exemplary embodiment are designated by the same signs, and are not described in detail here.

Figure 12:
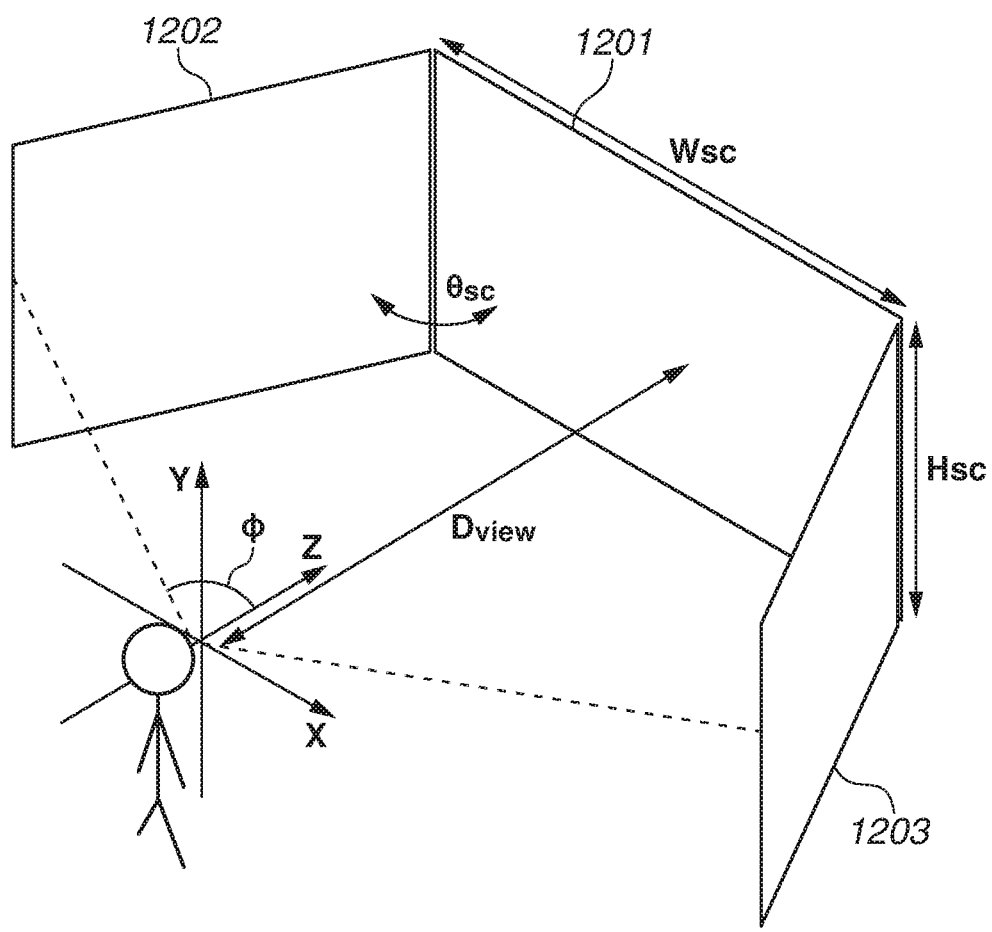
FIG. 12 is a diagram illustrating an example of a configuration of a display system.

FIG. 12 illustrates an example of a display system assumed in the present exemplary embodiment. In the display system according to the present exemplary embodiment, a display portion for displaying an image includes three displays of a center display 1201, a left display 1202, and a right display 1203. The center display 1201, the left display 1202, and the right display 1203 are placed to draw an isosceles trapezoid when viewed from above. As each display, a self-light-emitting device such as a liquid crystal display is used. The center display 1201 is placed in front of a viewer. The left display 1202 is placed in contact with the end of the center display 1201 on the left side of the viewer in such a manner that the angle between the left display 1202 and the center display 1201 is an angle θsc. Similarly, the right display 1203 is placed in contact with the end of the center display 1201 on the right side of the viewer in such a manner that the angle between the right display 1203 and the center display 1201 is the angle θsc. Thus, the three displays are placed in such a manner that normals to the respective display surfaces have an intersection. Then, on the intersection side of each display surface, a display image corresponding to the display surface is displayed.

The three flat display screens (displays) are placed in this way, whereby the display portion covers the field of vision of the viewer. If images are displayed by the display system, it is possible to give the viewer a realistic sensation as if the viewer were in the place where the displayed images are captured. In the present exemplary embodiment, the angle between a line segment connecting the center point in the up-down direction of the left end of the left display 1202 and the viewpoint position, and a line segment connecting the center point in the up-down direction of the right end of the right display 1203 and the viewpoint position is defined as a display angle. Further, the display images to be displayed on the respective displays are all generated from a single common input image. Thus, in the present exemplary embodiment, three display images are generated based on an input image captured using a single imaging apparatus (e.g., a digital camera).

Figure 13:
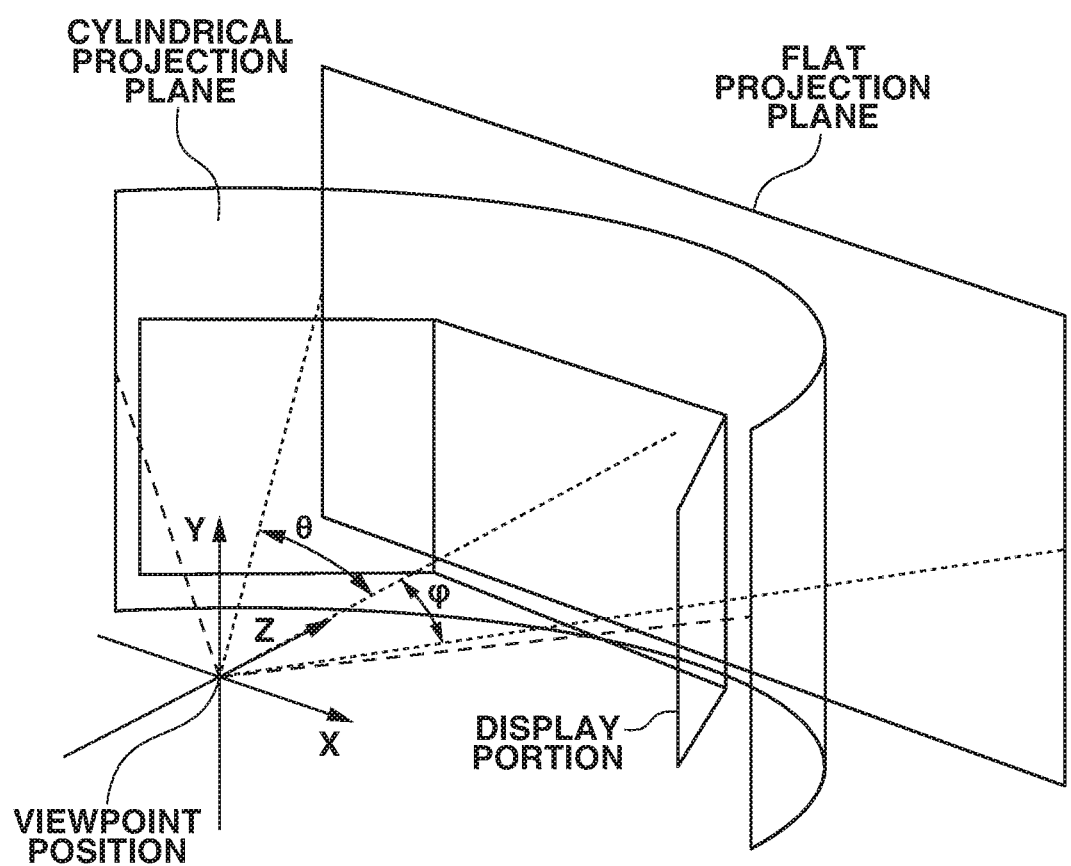
FIG. 13 is a diagram illustrating relationships between a display portion, a flat projection plane, and a cylindrical projection plane.

The present exemplary embodiment is different from the first exemplary embodiment in the projection plane setting process performed by the projection plane setting unit 201. In the present exemplary embodiment, the projection plane setting unit 201 sets two different projection planes in a virtual space. FIG. 13 is a diagram illustrating the display portion and the two projection planes. A first projection plane is a flat projection plane for placing the input image in the virtual space (hereinafter, referred to as a "flat projection plane"). A second projection plane is a cylindrical projection plane for projecting the input image onto the configuration of the display portion (hereinafter, referred to as a "cylindrical projection plane"). The second projection plane has the function of approximating the input image to the configuration (shape) of the display portion. The display portion according to the present exemplary embodiment is placed in such a manner that the three displays are at certain angles to each other when viewed from above. If the display images for the respective displays are generated by directly associating the displays with the flat projection plane, and when the images are viewed from the viewpoint position, an object looks as if it is bent near the boundary between two adjacent displays. This is because the distance from the viewpoint to the object is converted into the distance from the viewpoint to the display portion. Thus, in the present exemplary embodiment, the display images for the respective displays are generated based on an image obtained by projecting the flat projection plane (first projection plane) onto the cylindrical projection plane (second projection plane). The shape of the second projection plane is to be more similar to a shape drawn by the three displays than the flat plane and should be a shape without corners when viewed from above. The distance between a point on the cylindrical projection plane and the viewpoint position smoothly changes in the horizontal direction. If the flat projection plane is associated with such a second projection plane, the display images are displayed on the display portion as if the viewer viewed an image projected onto the cylindrical projection plane from the viewpoint position. As a result, it is possible to suppress the phenomenon that an object looks as if it is bent near the boundary between two adjacent displays.

Figure 15:
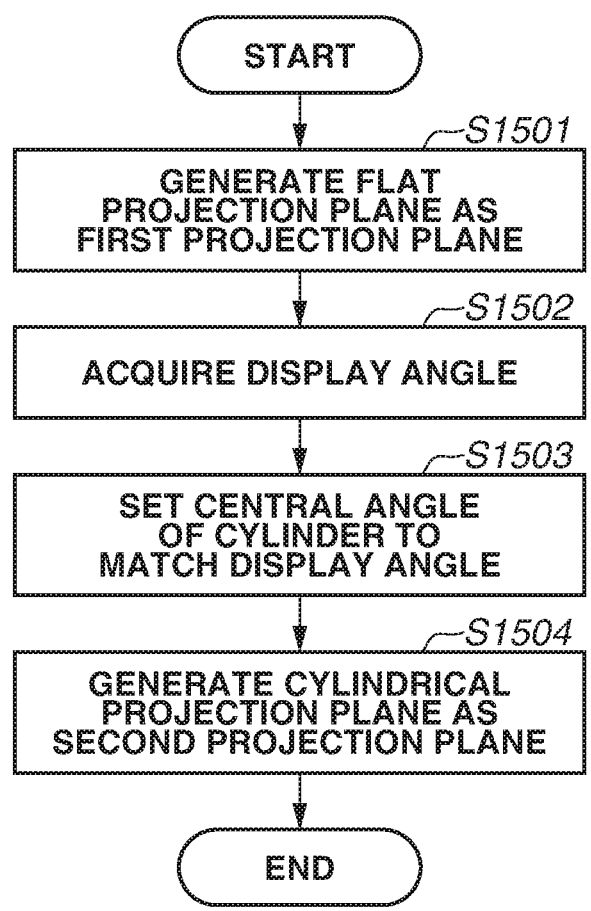
FIG. 15 is a flowchart illustrating a projection plane setting process.

FIG. 15 is a detailed flowchart of a projection plane setting process according to the present exemplary embodiment.

In step S1501, the projection plane setting unit 201 generates the flat projection plane and places the generated flat projection plane in a virtual space. The flat projection plane is composed of a rectangular flat plane having the same aspect ratio as that of the captured image. Further, the projection plane setting unit 201 calculates the size and the position of the flat projection plane so that the visual angle at which the flat projection plane is viewed from the viewpoint position matches the imaging angle of view. Then, the projection plane setting unit 201 places the flat projection plane in the virtual space.

In step S1502, the projection plane setting unit 201 acquires a display angle 2φ, which is the visual angle at which the display portion is viewed from the viewpoint position. In step S1503, based on the display angle 2φ acquired in step S1502, the projection plane setting unit 201 sets the central angle of the arc of the cylindrical projection plane.

In step S1504, the projection plane setting unit 201 generates the cylindrical projection plane in the virtual space. The shape of the cylindrical projection plane is obtained by cutting out the side surface of a cylinder at the central angle set in step S1503. The height of the cylindrical projection plane is set so that the ratio between the circumferential length and the height of the cylindrical projection plane matches the ratio between the width and the height of the flat projection plane. The projection plane setting unit 201 places the cylindrical projection plane set according to the display system information in the virtual space, so that the center of the cylinder coincides with the viewpoint position. As a result, the cylindrical projection plane is placed at such a position that the Z-axis in the virtual space passes through the center of the cylindrical projection plane. As described above, as illustrated in FIG. 13, the projection plane setting unit 201 places the two projection planes in the virtual space.

Figure 14:
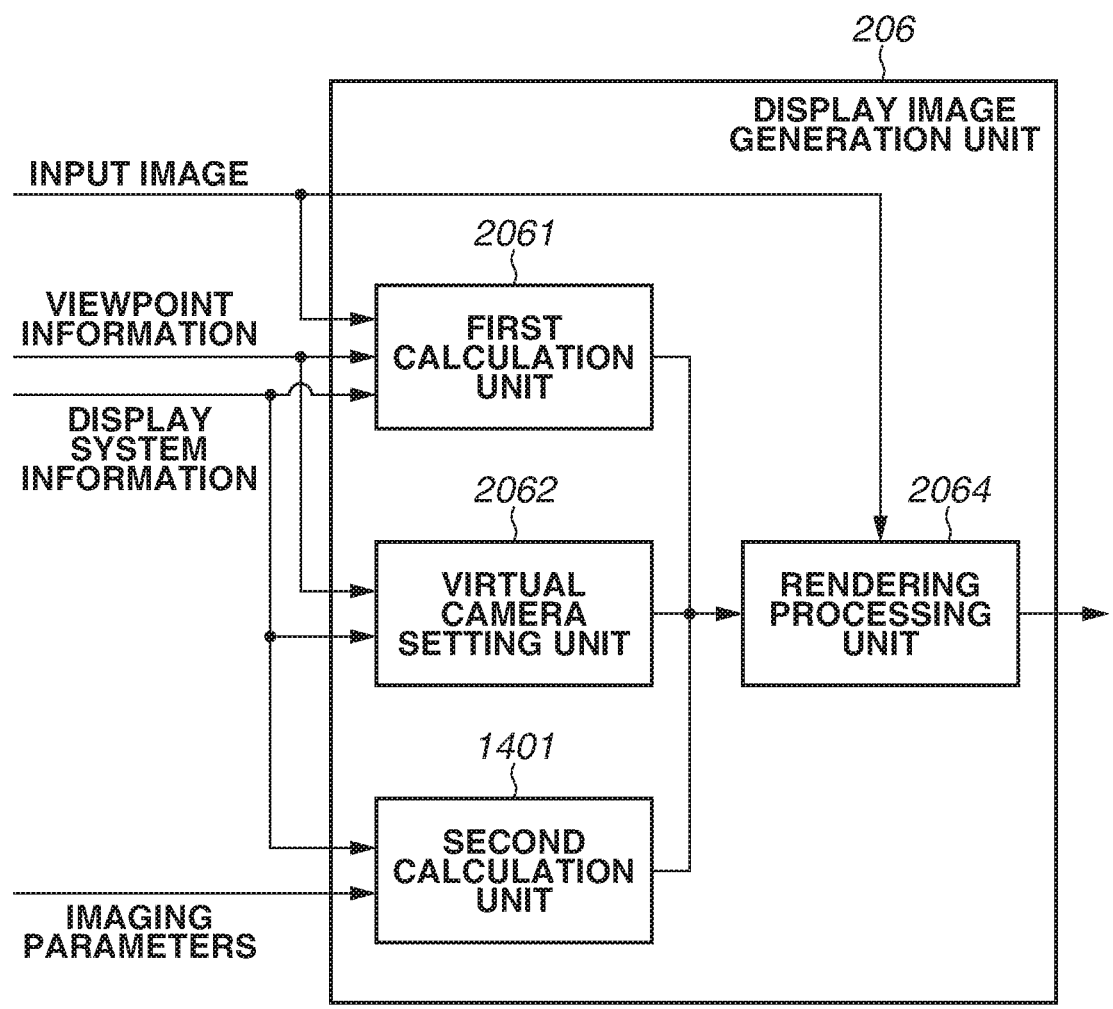
FIG. 14 is a block diagram illustrating a detailed configuration of a display image generation unit.

The details of a display image generation process according to the present exemplary embodiment are described. FIG. 14 is a block diagram illustrating a detailed configuration of the display image generation unit 206 according to the present exemplary embodiment. Using virtual cameras placed at the viewpoint position in the virtual space, the display image generation unit 206 renders the cylindrical projection plane to generate the display images corresponding to the respective displays. A first calculation unit 2061 calculates a correspondence relationship between the input image and the flat projection plane. A second calculation unit 1401 calculates a correspondence relationship between the flat projection plane and the cylindrical projection plane. A virtual camera setting unit 2062 sets a virtual camera corresponding to each of a plurality of displays in the virtual space. Since three displays are provided in the display system assumed in the present exemplary embodiment, three virtual cameras are set. Regarding each virtual camera, using the correspondence relationship between the input image and the flat projection plane, and the correspondence relationship between the flat projection plane and the cylindrical projection plane, a rendering processing unit 2064 calculates the pixel value of each pixel in an image formed in the virtual camera to generate the display image.

Figure 17:
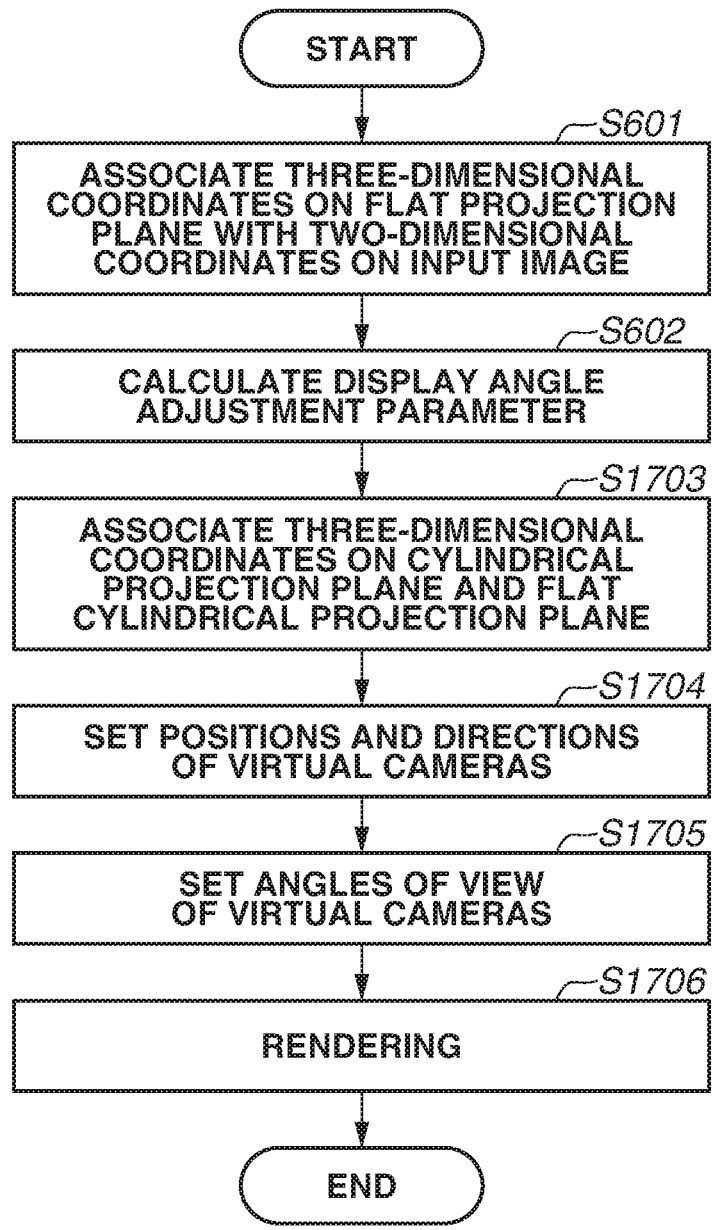
FIG. 17 is a flowchart illustrating a display image generation process.

FIG. 17 is a flowchart illustrating details of the display image generation process according to the present exemplary embodiment. The present exemplary embodiment is different from the first exemplary embodiment in the processes of step S1703 and subsequent steps. In the processes of step S1703 and the subsequent steps, the display portion according to the first exemplary embodiment is replaced with the cylindrical projection plane. In the present exemplary embodiment, as illustrated in FIG. 13, the display portion has a different shape from that of the cylindrical projection plane.

Figure 16A:
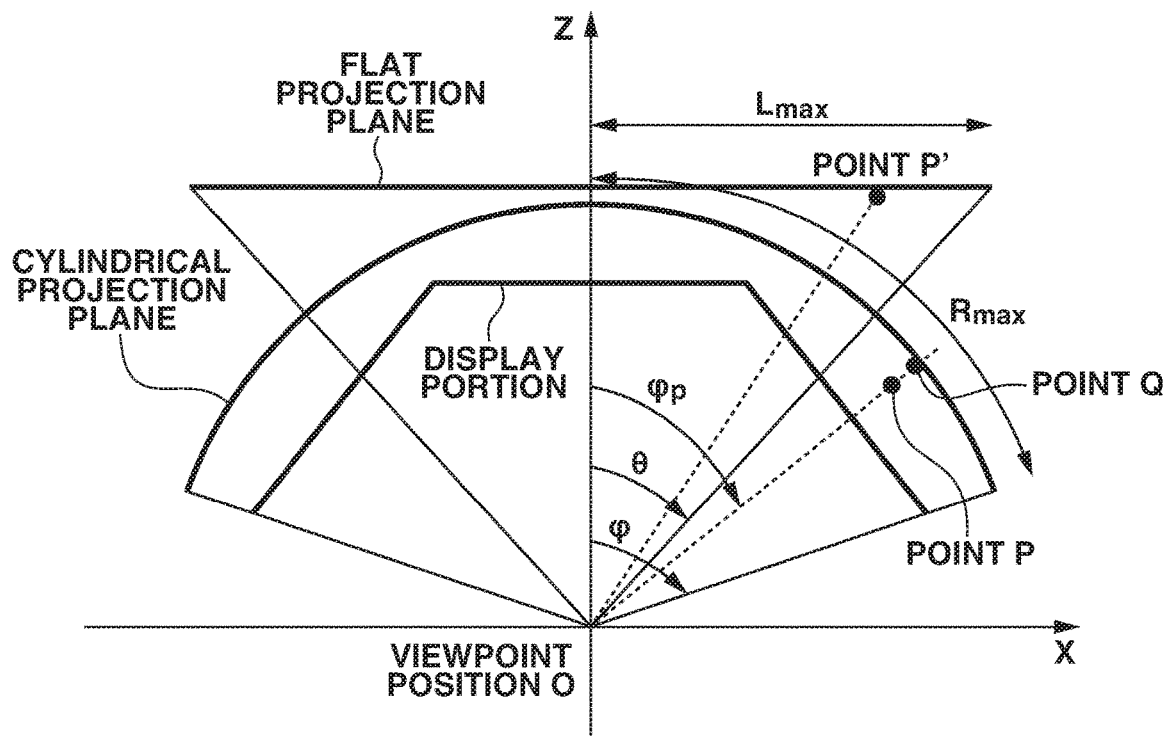
FIGS. 16A and 16B are top views of the display portion and the projection planes.

In step S1703, the second calculation unit 1401 calculates the correspondence relationship between the cylindrical projection plane and the flat projection plane in the virtual space. FIG. 16A is a top view of the display portion, the cylindrical projection plane, and the flat projection plane in the virtual space. A point P on the display portion is set in such a manner that the intersection of a line segment connecting the viewpoint position and the point P and the cylindrical projection plane is a point Q. At this time, in the present exemplary embodiment, the correspondence relationship between the point P on the display portion (curved screen 401) and the point V on the flat projection plane in the first exemplary embodiment can be replaced with the correspondence relationship between the point Q on the cylindrical projection plane and a point V on the flat projection plane. An angle $\varphi_p$ between the Z-axis and the point P on the display portion matches an angle $\varphi_q$ between the Z-axis and the point Q on the cylindrical projection plane. Accordingly, similar to the first exemplary embodiment, the X-coordinate of the point V can be calculated by using formula (6).

Similarly, the second calculation unit 1401 can also calculate the Y-coordinate of the point P' on the flat projection plane corresponding to the point P on the display portion by formula (8). In the present exemplary embodiment $H_{curve}$ is the height of the cylindrical projection plane. Further, the aspect ratio ($H_{flat}/2L_{max}$) of the flat projection plane matches the aspect ratio ($H_{curve}/2R_{max}$) of the cylindrical projection plane. Thus, the Y-coordinate may be calculated by replacing h in formula (8) with the height $H_{flat}$ of the flat projection plane. Regarding the Z-coordinate, since the flat projection plane is a flat plane, the Z-coordinate may be caused to coincide with a Z-coordinate $L_z$ on the flat projection plane.

Figure 16B:
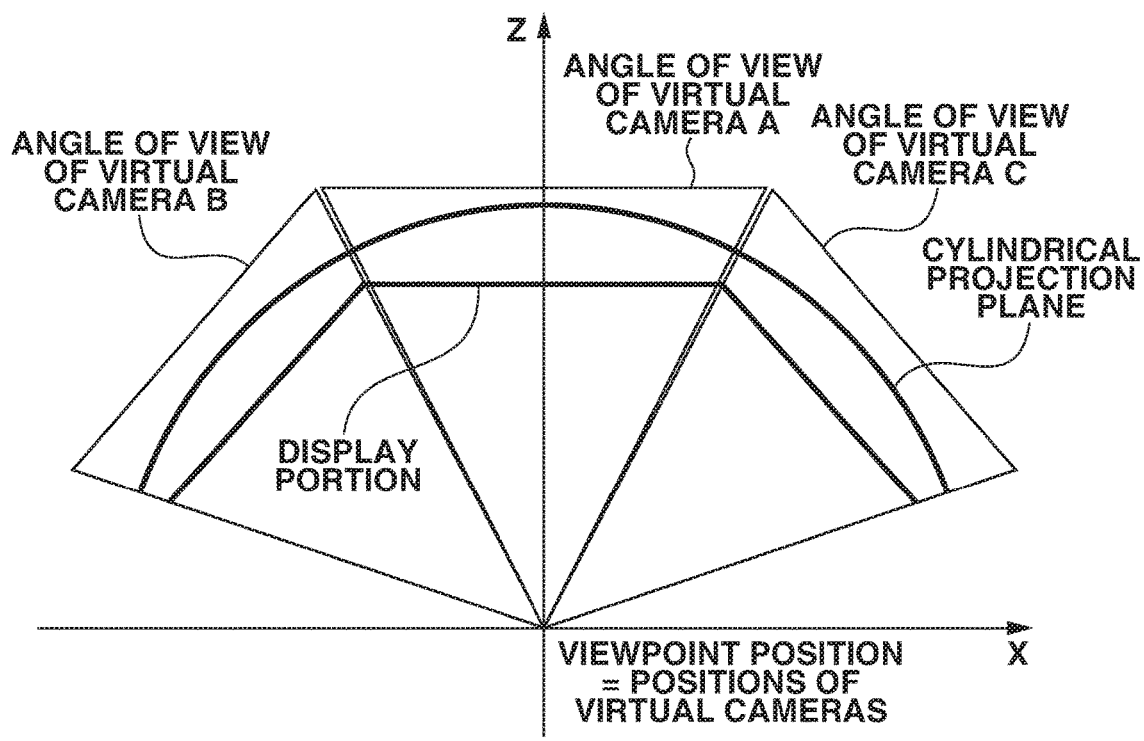

In step S1704, the virtual camera setting unit 2062 sets the positions and the directions of virtual cameras to be used for a rendering process for rendering the display images. FIG. 16B is a diagram illustrating the positions and the directions of the virtual cameras according to the present exemplary embodiment. The virtual camera setting unit 2062 prepares a total of three virtual cameras corresponding to the respective displays. More specifically, the virtual camera setting unit 2062 sets a virtual camera A for the center display 1201, a virtual camera B for the left display 1202, and a virtual camera C for the right display 1203 in the virtual space. The positions of the virtual cameras are at the viewpoint position, i.e., the center of the cylindrical projection plane. The directions of the virtual cameras are set so that the optical axis of each virtual camera is directed to the center of the display corresponding to the virtual camera.

In step S1705, the virtual camera setting unit 2062 sets the angles of view of the virtual cameras. The virtual camera setting unit 2062 sets, as the angle of view of each virtual camera, the visual angle at which the display corresponding to the virtual camera is viewed from the viewpoint position.

In step S1706, the rendering processing unit 2064 executes the rendering process with respect to each of the three virtual cameras to generate display image data representing the display image. Specifically, first, the rendering processing unit 2064 calculates three-dimensional coordinates on the cylindrical projection plane to be projected onto each pixel in an image obtained by the virtual camera performing imaging in the virtual space. Next, based on the correspondence relationship between the flat projection plane and the cylindrical projection plane calculated in step S1703, the rendering processing unit 2064 converts the three-dimensional coordinates on the cylindrical projection plane into three-dimensional coordinates on the flat projection plane. Further, based on the correspondence relationship between the flat projection plane and the input image calculated in step S601, the rendering processing unit 2064 converts the three-dimensional coordinates on the flat projection plane into a position on the input image. This processing associates the pixel in the image obtained by the virtual camera with the position on the input image.

The rendering processing unit 2064 performs sampling based on the calculated position on the input image to thereby calculate the pixel value of each pixel in the image obtained by the virtual camera. More specifically, the rendering processing unit 2064 acquires the pixel values of four pixels around the calculated position on the input image. The rendering processing unit 2064 executes interpolation calculations based on the calculated position on the pixel values of the four pixels acquired from the input image, to thereby determine the pixel value of each pixel in the image obtained by the virtual camera. The above processing is performed on all the pixels of each virtual camera, to thereby generate the display images to be displayed on the respective displays.

As described above, in the present exemplary embodiment, display images to be displayed on three display screens (displays) are generated based on a single input image. The display angle parameter k calculated using the display angle and the imaging angle of view is used, whereby it is possible to easily calculate a correspondence relationship between an X-coordinate on the flat projection plane and an X-coordinate on the cylindrical projection plane.

In the present exemplary embodiment, a description has been given taking, as an example, a case where a display portion includes three displays in a display system that displays a display image. The display portion may use a screen onto which a projector projects an image similar to the first exemplary embodiment, instead of a self-light-emitting display. In this case, in the display system, a plurality of projectors corresponding to a plurality of screens is installed so that the projectors can project display images onto the respective screens. Alternatively, the above-described exemplary embodiment can also be applied to a display system where a plurality of projectors projects images onto white walls. If the walls onto which the images are projected have shapes similar to those of the displays illustrated in FIG. 12 when viewed from above, the display images are generated using a cylindrical projection plane, whereby similar effects can be obtained. In this case, display system information is acquired considering, as a display portion, an area where the images are projected onto the white walls.

Further, an example has been described where a single common cylindrical projection plane is used for the center display 1201, the left display 1202, and the right display 1203. In this way, it is possible to generate display images that can be displayed without a feeling of discomfort even between different displays. Alternatively, for example, projection planes having different curved planes may be set for three displays. In this case, it is desirable to configure the three cylindrical projection planes to be smoothly connected.

<Variations>

In the above-described exemplary embodiment, the display angle parameter k is calculated from the simple ratio between the arc length $R_{max}$ of the cylindrical projection plane and the maximum image height $L_{max}$ in the horizontal direction of the flat projection plane. Thus, as illustrated in formula (6), a position in the horizontal direction on the flat projection plane and a position on the arc of the cylindrical projection plane have a linear relationship. However, for example, similar effects can also be obtained by determining the correspondence relationship between a position in the horizontal direction on the flat projection plane and a position on the arc of the cylindrical projection plane so that the correspondence relationship is a monotonic increase. For example, the correspondence relationship between a position in the horizontal direction on the flat projection plane and a position on the arc of the cylindrical projection plane is calculated so that the further outside the position in the horizontal direction on the flat projection plane, the greater the amount of change in the angle (the image is stretched out). As a result, it is possible to reduce distortion in an image in the front direction when viewed from the viewpoint position. Consequently, in a scene where objects are placed in a concentrated manner in the center, it is possible to achieve a natural display with small distortion in an image for a viewer who gazes forward.

In the above-described exemplary embodiment, a description has been given of the method for generating the display image using the display angle parameter. In a third exemplary embodiment, a description is given of a method for performing the process of moving a virtual viewpoint position, to thereby generate a display image for achieving viewing at a wide viewing angle. Similar to the second exemplary embodiment, the present exemplary embodiment is described taking, as an example, the display system illustrated in FIG. 12. Components similar to those of the second exemplary embodiment are designated by the same signs, and are not described here.

In the third exemplary embodiment, based on the imaging angle of view at which the input image is captured and the display angle of the display portion, the display image generation unit 206 controls a virtual viewpoint position. The details of the display image generation unit 206 will be described below.

Figure 20:
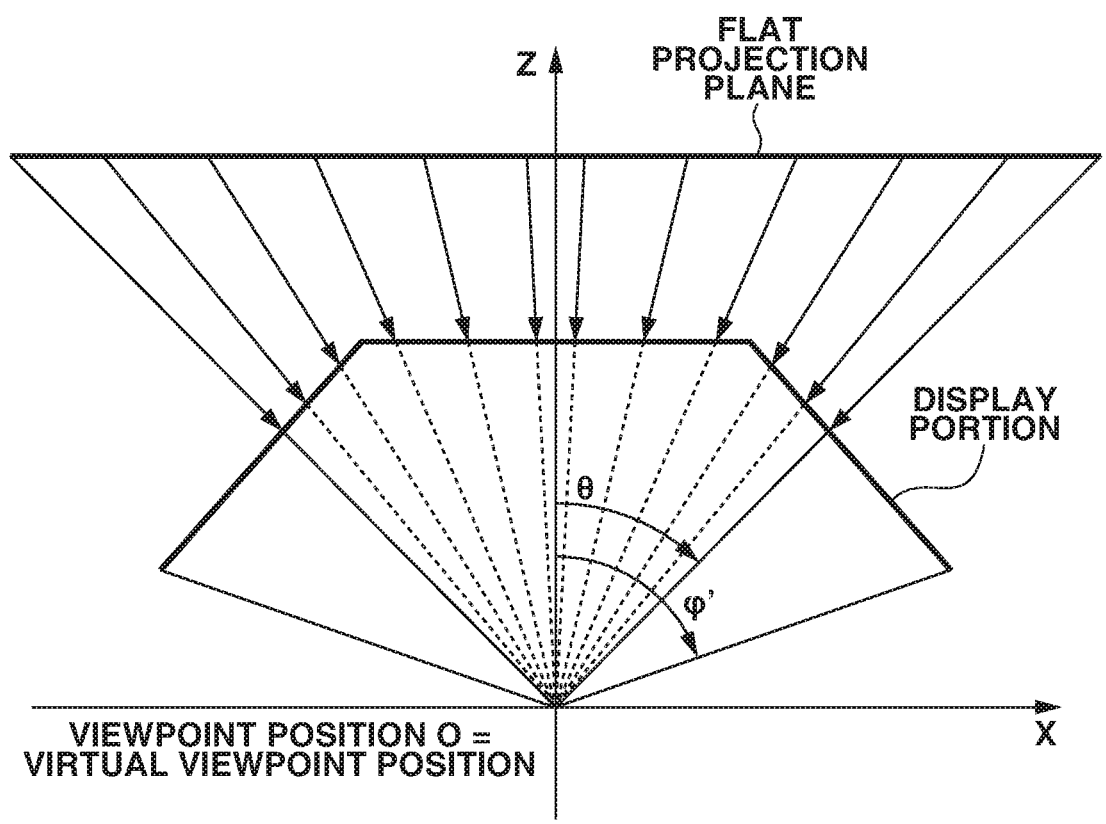
FIG. 20 is a diagram illustrating a relationship between the display portion and the projection plane viewed along an XZ-plane.

In the present exemplary embodiment, the display system information acquisition unit 203 acquires the number of displays of "3" as display system information. Further, the display system information acquisition unit 203 acquires, as information indicating the shape of each display, information indicating that the shape is a rectangular flat plane having a width Wsc and a height Hsc. The three displays are placed in such a manner that the opening angle between a center display 1201 and a right display 1203 and the opening angle between the center display 1201 and a left display 1202 are both an angle θsc. The display system information acquisition unit 203 acquires display system information including the angle θsc as information regarding the placement of the displays. Further, the viewpoint information acquisition unit 204 acquires, as viewpoint information, a distance Dview from the central position on the screen of the center display 1201. Next, a projection plane setting process according to the present exemplary embodiment is described in detail. In the projection plane setting process according to the present exemplary embodiment, only a flat projection plane corresponding to the input image (hereinafter, a "flat projection plane") is set in a virtual space. The flat projection plane is composed of a flat plane having the same aspect ratio as the aspect ratio of the input image. The projection plane setting unit 201 calculates the size and the position of the flat projection plane so that the visual angle at which the flat projection plane is viewed from the viewpoint position in the virtual space matches the imaging angle of view. Then, the projection plane setting unit 201 places the flat projection plane in the virtual space. In this case, half the imaging angle of view in the horizontal direction is assumed to be θ. In the present exemplary embodiment, in the virtual space, an XYZ three-dimensional coordinate system where the viewpoint position is the origin is defined. FIG. 20 is a diagram illustrating an XZ-plane on which the display portion and the flat projection plane are viewed from above in the virtual space. As illustrated in FIG. 20, the flat projection plane is placed parallel to the XY-plane and at such a position that a Z-axis passes through the center of the flat projection plane. If flat planes representing the display portion are placed in the virtual space, the displays of the display portion are placed in such a manner that the distance between the origin (the viewpoint position) and the central position of the center display 1201 is Dview. In other words, the center coordinates of the center display 1201 are (0, 0, Dview). The three displays are placed symmetrically with respect to the Z-axis.

A display image generation process is described in detail. Using virtual cameras placed at a viewpoint position in the virtual space, the display image generation unit 206 renders the flat projection plane, to thereby generate the display images corresponding to the respective displays.

Figure 18:
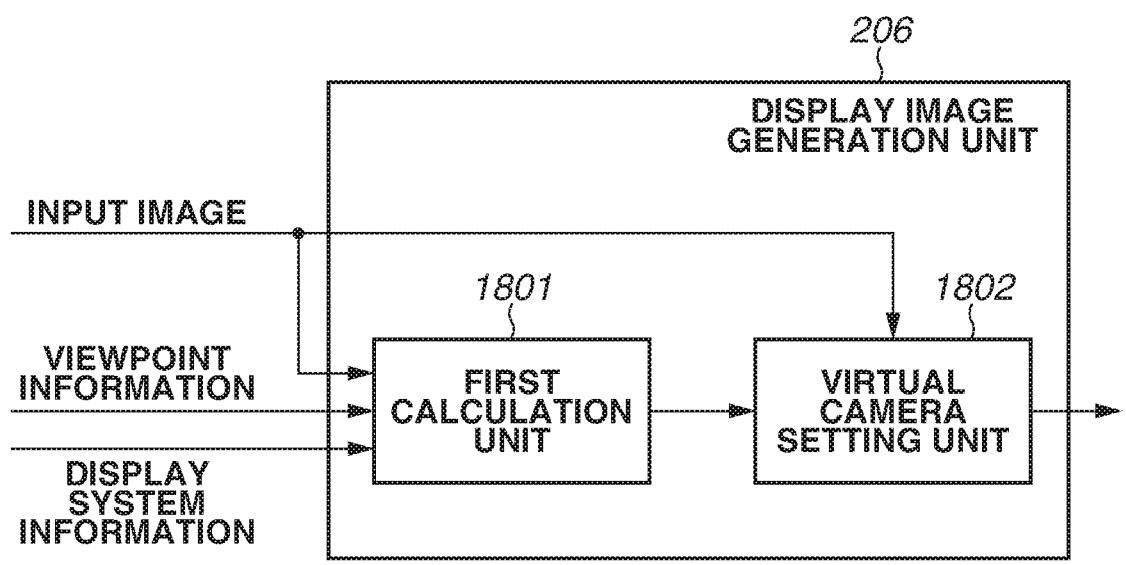
FIG. 18 is a block diagram illustrating a detailed configuration of a display image generation unit.
Figure 19:
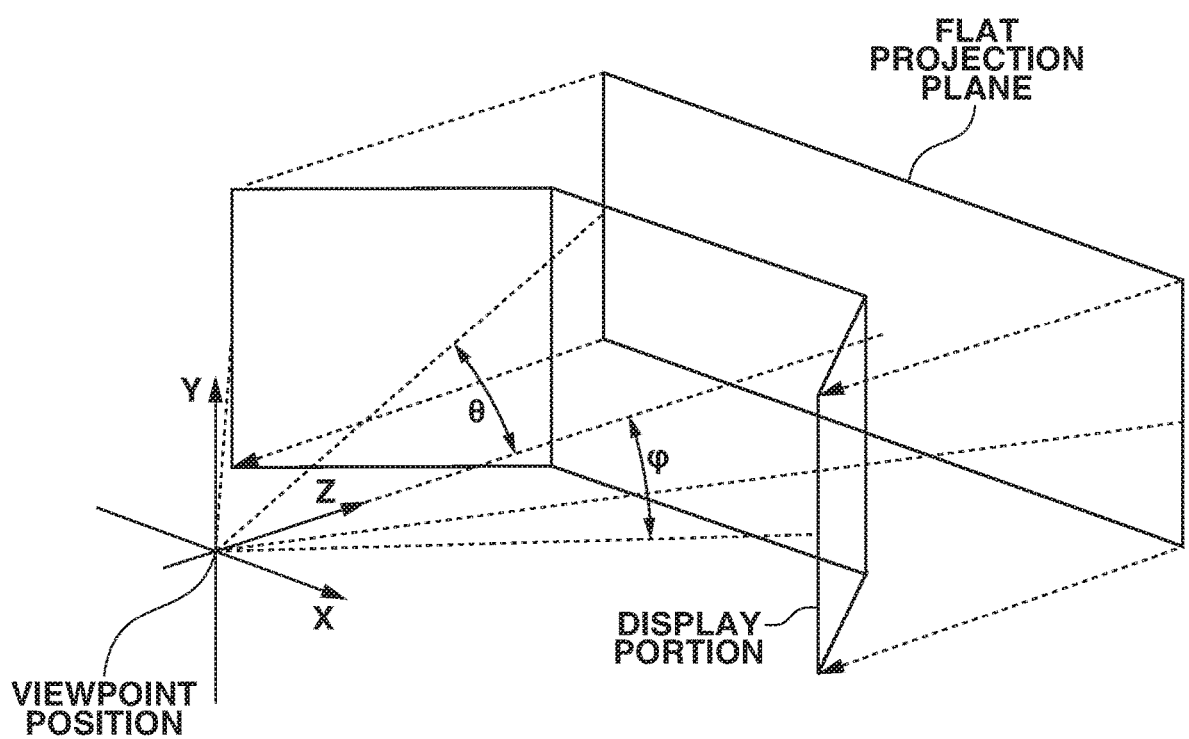
FIG. 19 is a diagram illustrating a relationship between a display portion and a flat projection plane.
Figure 22:
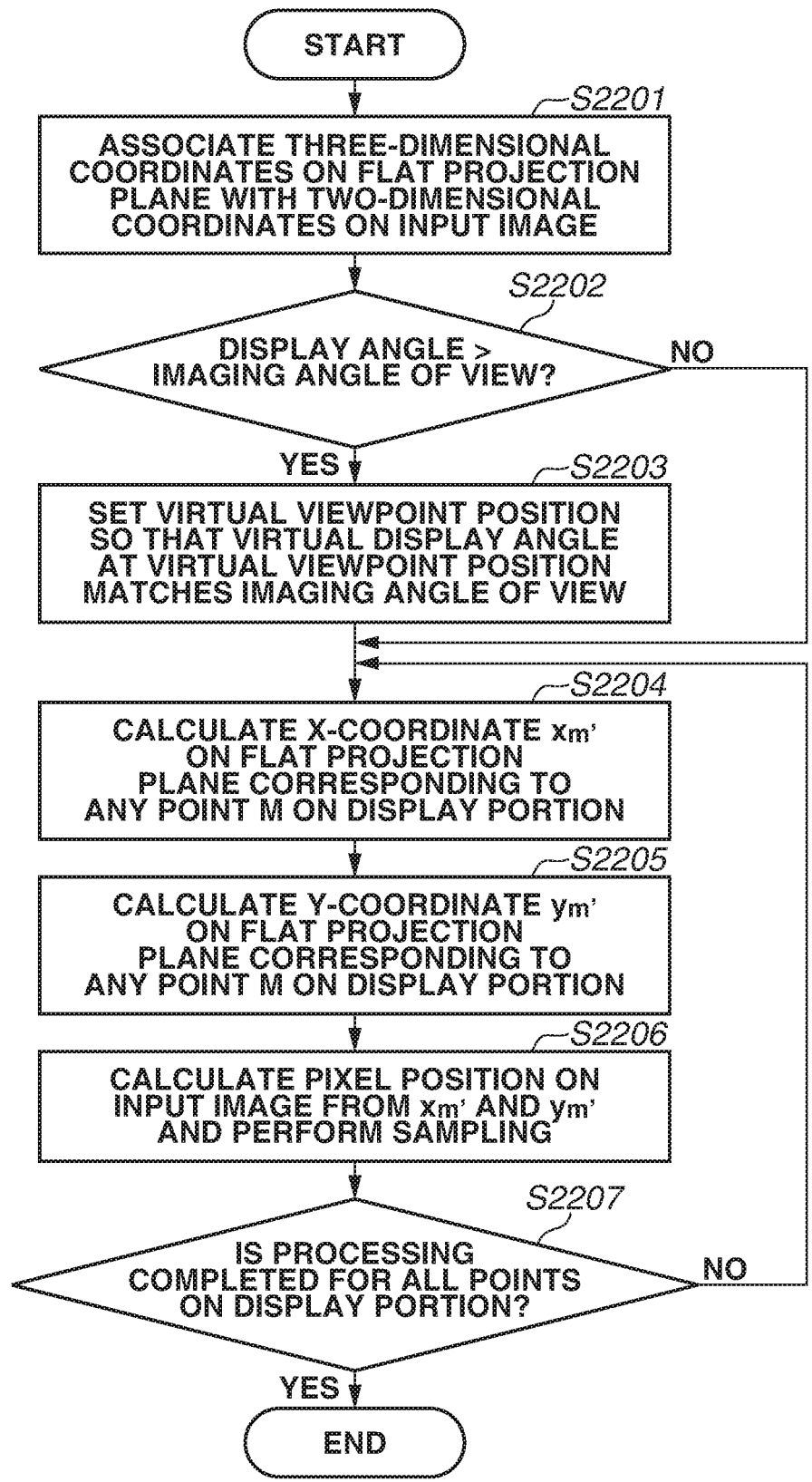
FIG. 22 is a flowchart illustrating a display image generation process.

FIG. 18 is a block diagram illustrating detailed configuration of the display image generation unit 206. A first calculation unit 1801 calculates a correspondence relationship between the input image and the flat projection plane. Using the correspondence relationship between the input image and the flat projection plane, a rendering processing unit 1802 renders the flat projection plane. FIG. 22 is a flowchart illustrating details of the display image generation process according to the present exemplary embodiment. Steps in the flowchart are described below.

In step S2201, the first calculation unit 1801 associates the three-dimensional coordinates of the vertices of the flat virtual projection plane with two-dimensional coordinates indicating pixel positions in the captured image. In a case where an input image captured through a lens using a central projection is used, this association is similar to that illustrated in FIG. 8. However, hereinafter, the flat projection plane is designated as "M" instead of "S" for illustrative purposes.

In step S2202, the rendering processing unit 2064 compares the display angle with the imaging angle of view in the horizontal direction. If the display angle is greater than the imaging angle of view (YES in step S2202), the processing proceeds to step S2203. If not (NO in step S2202), the processing proceeds to step S2204.

Figure 21:
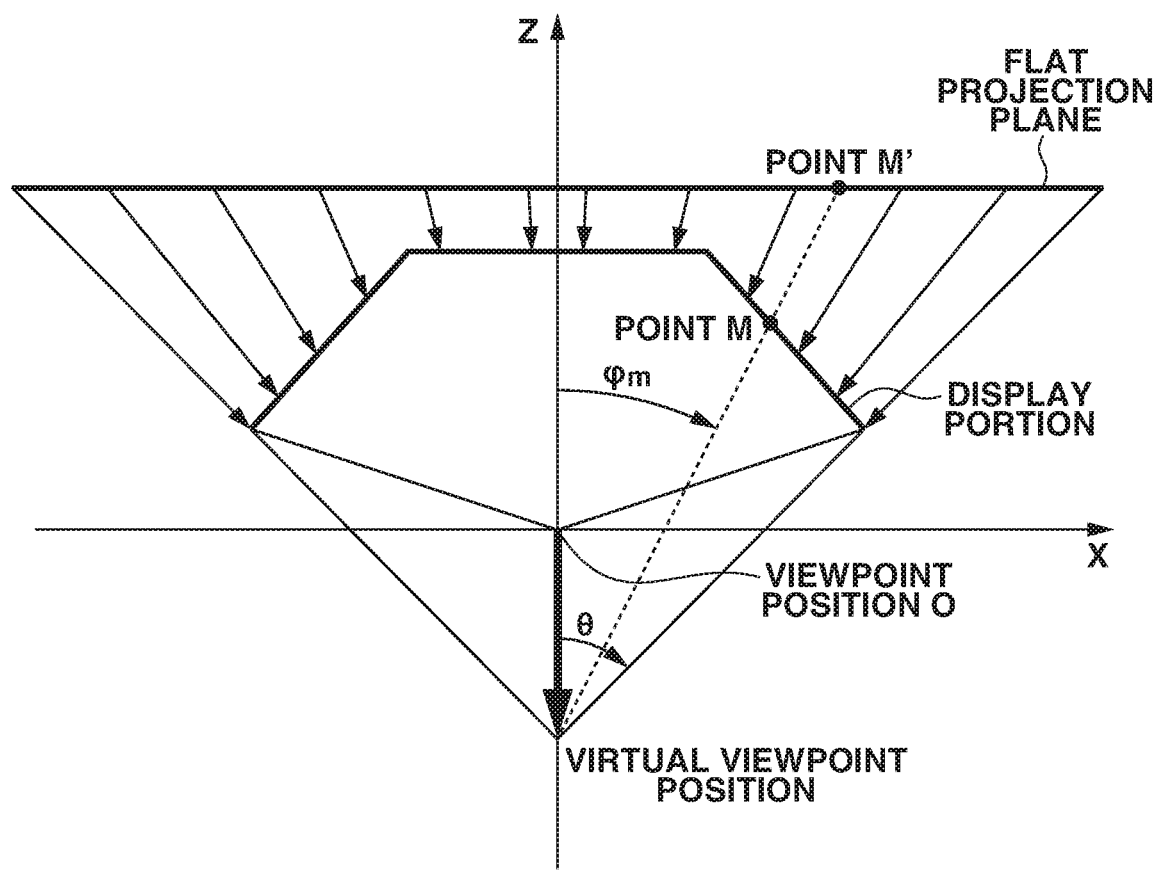
FIG. 21 is a diagram illustrating the relationship between the display portion and the projection plane viewed along the XZ-plane.

In step S2203, the rendering processing unit 1802 sets the position of a virtual viewpoint (hereinafter, a "virtual viewpoint position") as a reference for a rendering process. More specifically, the rendering processing unit 1802 defines, as a virtual display angle, the visual angle at which the display portion is viewed from the virtual viewpoint position, and sets the virtual viewpoint position so that the virtual display angle matches the imaging angle of view. FIG. 20 is a diagram illustrating a relationship between the flat projection plane and the display portion in a case where the virtual viewpoint position coincides with the viewpoint position indicated by the viewpoint information. If the display angle of the display portion is greater than the imaging angle of view as in FIG. 20, and if the flat projection plane is projected as it is onto the surfaces of the displays included in the display portion, images are not displayed in some areas on the left and right of the display portion. To solve this issue, in the present exemplary embodiment, based on the imaging angle of view and the display angle, the rendering processing unit 2064 sets the virtual viewpoint position for rendering at a different position from the viewpoint position. FIG. 21 is a diagram illustrating the virtual viewpoint position. The rendering processing unit 2064 moves the virtual viewpoint position in the negative Z-axis direction to the position where a virtual display angle φ' matches an imaging angle of view θ.

In step S2204, the rendering processing unit 1802 calculates an X-coordinate $x_{m'}$ of a point M' on the flat projection plane corresponding to a point M (x, y, z) on the display portion by using formula (14).

$$x_{m'} = \frac{\tan\varphi_m}{\tan\theta} \cdot \frac{W_{flat}}{2} \tag{14}$$

In formula (14), $\varphi_m$ is the angle between a vector $OM_{xz}$ and the Z-axis when the foot of a perpendicular from the point M to the XZ-plane is a point $M_{xz}$. Further, $W_{flat}$ is the width of the flat projection plane.

In step S2205, the rendering processing unit 1802 calculates a Y-coordinate $y_{m'}$ of the point M' on the flat projection plane corresponding to the point M (x, y, z) on the display portion, using formula (14) used in step S2204. At this time, instead of the imaging angle of view θ in the horizontal direction, the imaging angle of view in the vertical direction is used. Further, instead of the angle $\varphi_m$, the angle between a vector $OM_{yz}$ and the Z-axis when the foot of a perpendicular from the point M to the YZ-plane is a point $M_{yz}$ is used. Further, instead of $W_{flat}$, the height of the flat projection plane is used for calculation. Regarding the Z-coordinate, since the flat projection plane is a flat plane, the Z-coordinate does not change at any point on the flat projection plane. Thus, the Z-coordinate is caused to coincide with the Z-coordinate on the flat projection plane set in the projection plane setting process.

In step S2206, using the correspondence relationship between the three-dimensional coordinates indicating the flat projection plane and the two-dimensional coordinates indicating the input image, the rendering processing unit 1802 calculates a position I(u, v) on the input image from the three-dimensional coordinates of the point M' on the flat projection plane and performs sampling. More specifically, the rendering processing unit 1802 acquires pixel values of four pixels near the position I(u, v) and performs interpolation calculations based on the distances between the four pixels and the position I(u, v), to thereby determine the pixel value of the pixel to be displayed at the point M.

In step S2207, the rendering processing unit 1802 determines whether the pixel values of the pixels in the display images to be displayed are calculated for all the points on the display portion. If the pixel values are calculated for all the pixels (YES in step S2207), the processing ends. If the calculations of the pixel values are not completed (NO in step S2207), the rendering processing unit 1802 updates the point M to a pixel that has not yet been processed. Then, the processing returns to step S2204 and continues.

Through the above processing, in a case where the display angle at which a display portion is viewed is greater than the imaging angle of view, a virtual viewpoint position is set so that the imaging angle of view matches the display angle at the virtual viewpoint position, and display images are generated. In this way, it is possible to generate display images satisfying the display angle with a small feeling of discomfort. In the present exemplary embodiment, a description has been given, taking as an example, a case where a display portion includes three displays in a display system that displays a display image. The display portion may use a screen onto which a projector projects an image, instead of a self-light-emitting display. In this case, in the display system, a plurality of projectors corresponding to a plurality of screens is installed so that the projectors can project display images onto the respective screens. Alternatively, the above-described exemplary embodiment can also be applied to a display system where a plurality of projectors projects images onto white walls. If the walls onto which the images are projected have shapes similar to those of the displays illustrated in FIG. 12 when viewed from above, a virtual viewpoint position is set so that the imaging angle of view matches the display angle at the virtual viewpoint position, and then, the display images are generated, whereby similar effects can be obtained. In this case, display system information is acquired, considering as a display portion, an area where the images are projected onto the white walls. Also in the third exemplary embodiment, similar to the first exemplary embodiment, as the display portion, a curved display screen obtained by curving a flat plane in the horizontal direction can be used.

In the above-described exemplary embodiments, a description has been given, taking as an example, of a display portion using a large screen for a viewer as illustrated in FIGS. 4 and 12. However, a similar display system can be configured even with, for example, a display portion of such a size as to cover only the head, such as a head-mounted display. Also for such a display system, similar to the above exemplary embodiments, display images for respective display screens are generated from a single common input image. Further, in a virtual space, the display images are rendered using the process of calculating a display angle parameter from an input image or moving a virtual viewpoint position, whereby it is possible to easily generate a wide-field image without a feeling of discomfort.

In the above-described exemplary embodiments, the viewpoint information is identified by specifying the desirable position of the viewer. Alternatively, for example, the position of the viewer may be actually detected, and the viewpoint information may be set based on the viewer actually viewing the display system.

In each of the above-described exemplary embodiments, the process of setting a projection plane in a virtual space is executed. Such a projection plane setting process is performed when a display image to be displayed by an assumed display system is generated for the first time. For example, however, in a case where a display system and an imaging apparatus are fixedly installed, a projection plane setting process is not necessarily required. For example, suppose that the generation of a desired display image is successful according to the above exemplary embodiments. Information indicating the virtual space at this time is saved in the ROM 103 or the HDD 105. Further, information indicating the correspondence relationship between the input image and the projection plane calculated in step S601 when the display image is generated, and information indicating the correspondence relationship between the flat projection plane and the cylindrical projection plane calculated in step S1703, are also similarly saved.

Thereafter, the virtual space set by the projection plane setting process when the display image is previously generated may be used. In this case, for example, in the case of the first exemplary embodiment, the processing illustrated in FIG. 5 is not necessary, and after step S304, the processing may proceed to step S306. Further, in step S601, instead of the calculation process, the process of reading the saved information indicating the correspondence relationship between the input image and the flat projection plane may be executed. As a result, if the display form of the display system or the imaging direction of the imaging apparatus does not greatly change, it is possible to generate a display image more easily.

The disclosure can also be achieved by a process of supplying a program for achieving one or more functions of the above-described exemplary embodiments to a system or an apparatus via a network or a storage medium, and of causing one or more processors of a computer of the system or the apparatus to read and execute the program. Further, the disclosure can also be achieved by a circuit (e.g., an application-specific integrated circuit (ASIC)) for achieving the one or more functions.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2018-028113, filed Feb. 20, 2018, and No. 2018-028177, filed Feb. 20, 2018, which are hereby incorporated by reference herein in their entirety.

What is claimed is:

1. An apparatus, comprising:
   at least one processor; and
   a memory coupled to the at least one processor, the memory having instructions that, when executed by the at least one processor, performs operations as:
   a first acquisition unit configured to acquire an imaging angle of view at which an input image is captured;
   a second acquisition unit configured to acquire display system information indicating, in a display system including a display portion, a display angle, which is a visual angle at which the display portion is viewed from a viewpoint position;

a generation unit configured to, using a correspondence relationship between a projection plane in a virtual space and the display portion based on the imaging angle of view and the display system information, generate a display image to be displayed on the display portion; and a calculation unit configured to calculate a parameter based on the imaging angle of view and the display angle, wherein the generation unit calculates, using the parameter, a position on the projection plane corresponding to a position on the display portion and generates the display image by rendering a pixel value of the calculated position based on the input image.

2. The apparatus according to claim 1, wherein the imaging angle of view is smaller than the display angle.

3. The apparatus according to claim 1, wherein the at least one processor further preforms operations as a setting unit configured to, based on the imaging angle of view and the display system information, set the projection plane in the virtual space.

4. The apparatus according to claim 3, wherein the setting unit sets the projection plane based on an aspect ratio of the input image and the imaging angle of view.

5. The apparatus according to claim 3, wherein the display portion is configured such that a plurality of flat display screens that displays images is placed to cover the viewpoint position, and wherein the setting unit sets, as the projection plane, a first projection plane corresponding to the input image and a second projection plane corresponding to the display system information.

6. The apparatus according to claim 3, wherein the display portion is configured such that three display screens are placed so that normals to the display screens have an intersection, and wherein the setting unit sets, as a second projection plane, a projection plane having a shape obtained by curving a flat plane in a horizontal direction.

7. The apparatus according to claim 1, wherein the at least one processor further performs operations as a setting unit configured to, based on the imaging angle of view and the display system information, set a first projection plane corresponding to the input image and a second projection plane corresponding to the display angle, as the projection plane, wherein the generation unit calculates, using the parameter, a correspondence relationship between the first and second projection planes.

8. The apparatus according to claim 1, wherein the calculation unit calculates the parameter based on a ratio between the imaging angle of view and the display angle.

9. The apparatus according to claim 1, wherein the generation unit converts, using the parameter, an X-coordinate indicating a position on the display portion into an X-coordinate on the projection plane.

10. The apparatus according to claim 1, wherein the generation unit sets, based on the imaging angle of view, a virtual viewpoint position in the virtual space and renders the projection plane from the virtual viewpoint position.

11. The apparatus according to claim 10, wherein the at least one processor further performs operations as:

a third acquisition unit configured to acquire viewpoint information indicating the viewpoint position from which the display portion is viewed; and a comparison unit configured to compare the display angle and the imaging angle of view, wherein the generation unit generates the display image based on a result of the comparison by the comparison unit.

12. The apparatus according to claim 11, wherein the generation unit sets, in a case where the comparison unit determines that the display angle is greater than the imaging angle of view, the virtual viewpoint position at a different position from the viewpoint position indicated by the viewpoint information, and wherein the generation unit sets, in a case where the comparison unit determines that the display angle is not greater than the imaging angle of view, the virtual viewpoint position at the viewpoint position indicated by the viewpoint information.

13. The apparatus according to claim 12, wherein the generation unit moves, in a case where the comparison unit determines that the display angle is greater than the imaging angle of view, the virtual viewpoint position from the viewpoint position indicated by the viewpoint information in a direction away from the projection plane.

14. The apparatus according to claim 1, wherein the at least one processor further performs operations as a holding unit configured to hold information indicating a correspondence relationship between the input image and the projection plane, wherein the generation unit reads the information indicating the correspondence relationship between the input image and the projection plane from the holding unit.

15. The apparatus according to claim 1, wherein the display system is a system where the display portion is placed to cover a field of vision in a horizontal direction from the viewpoint position.

16. A method, comprising:

acquiring an imaging angle of view at which an input image is captured;

acquiring display system information indicating, in a display system including a display portion, a display angle, which is a visual angle at which the display portion is viewed from a viewpoint position; and generating, using a correspondence relationship between a projection plane in a virtual space and the display portion based on the imaging angle of view and the display system information, a display image to be displayed on the display portion; and calculating a parameter based on the imaging angle of view and the display angle, wherein the generating calculates, using the parameter, a position on the projection plane corresponding to a position on the display portion and generates the display image by rendering a pixel value of the calculated position based on the input image.

17. A non-transitory computer-readable storage medium storing a computer program for causing a computer to execute a method, the method comprising:

acquiring an imaging angle of view at which an input image is captured;

acquiring display system information indicating, in a display system including a display portion, a display angle, which is a visual angle at which the display portion is viewed from a viewpoint position;

generating, using a correspondence relationship between a projection plane in a virtual space and the display portion based on the imaging angle of view and the display system information, a display image to be displayed on the display portion; and calculating a parameter based on the imaging angle of view and the display angle,
wherein the generating calculates, using the parameter, a position on the projection plane corresponding to a position on the display portion and generates the display image by rendering a pixel value of the calculated position based on the input image.

\* \* \* \* \*